US010671631B2

(12) United States Patent
Wolfman et al.

(10) Patent No.: US 10,671,631 B2
(45) Date of Patent: Jun. 2, 2020

(54) METHOD, APPARATUS, AND COMPUTER-READABLE MEDIUM FOR NON-STRUCTURED DATA PROFILING

(71) Applicant: Informatica LLC, Redwood City, CA (US)

(72) Inventors: Gadi Wolfman, Herzliya (IL); Uri Vax, Tel Aviv (IL); Shanavazh Basha Shotabai, Bangalore (IN); Ofer Lahav, Givatayim (IL)

(73) Assignee: Informatica LLC, Redwood City, CA (US)

( * ) Notice: Subject to any disclaimer, the term of this patent is extended or adjusted under 35 U.S.C. 154(b) by 636 days.

(21) Appl. No.: 15/339,050

(22) Filed: Oct. 31, 2016

(65) Prior Publication Data

US 2018/0121526 A1    May 3, 2018

(51) Int. Cl.
| | | |
|---|---|---|
| *G06F 16/25* | (2019.01) | |
| *G06F 16/35* | (2019.01) | |
| *G06F 16/84* | (2019.01) | |
| *G06F 16/182* | (2019.01) | |
| *G06F 16/16* | (2019.01) | |

(52) U.S. Cl.
CPC .......... *G06F 16/258* (2019.01); *G06F 16/164* (2019.01); *G06F 16/182* (2019.01); *G06F 16/35* (2019.01); *G06F 16/84* (2019.01)

(58) Field of Classification Search
CPC ..... G06F 16/164; G06F 16/258; G06F 16/182
USPC ......................................................... 707/736
See application file for complete search history.

(56) References Cited

U.S. PATENT DOCUMENTS

| | | | | |
|---|---|---|---|---|
| 5,530,852 A | * | 6/1996 | Meske, Jr. .............. | H04L 67/30 707/E17.109 |
| 6,862,729 B1 | * | 3/2005 | Kuch ...................... | G06F 9/445 717/158 |
| 7,590,644 B2 | * | 9/2009 | Matsakis ................. | G06F 8/41 707/704 |
| 9,519,696 B1 | * | 12/2016 | Roth ...................... | G06F 16/258 |
| 9,619,588 B1 | * | 4/2017 | Lyons .................... | G06F 17/50 |
| 2004/0167904 A1 | | 8/2004 | Wen et al. | |
| 2005/0160361 A1 | * | 7/2005 | Young .................... | G06Q 10/10 715/249 |
| 2012/0204036 A1 | * | 8/2012 | Wack ..................... | G06Q 40/02 713/189 |
| 2016/0093475 A1 | * | 3/2016 | Gesche .................. | H05H 1/46 315/111.21 |
| 2018/0150528 A1 | * | 5/2018 | Shah ..................... | G06F 16/282 |

OTHER PUBLICATIONS

Informatica (Version 10.0) Data Discovery Guide, Nov. 2015.
Informatica (Version 10.0) Release Guide, Nov. 2015.

* cited by examiner

*Primary Examiner* — Shahid A Alam
(74) *Attorney, Agent, or Firm* — Amardeep S. Grewal; Richard Graham; Reed Smith LLP

(57) ABSTRACT

A system, a method, and a non-transitory computer readable for generating a profile of one or more data objects comprising determining a format of the at least one data object and selecting a data transformation policy based on the format of the at least one data object and generating a model descriptive of the non-structured data contained in the at least one data object based on the data transformation policy and selecting at least a portion of the model indicative of a portion of the non-structured data and generating a profile of the portion of the non-structured data contained in all of the one or more data objects.

51 Claims, 22 Drawing Sheets

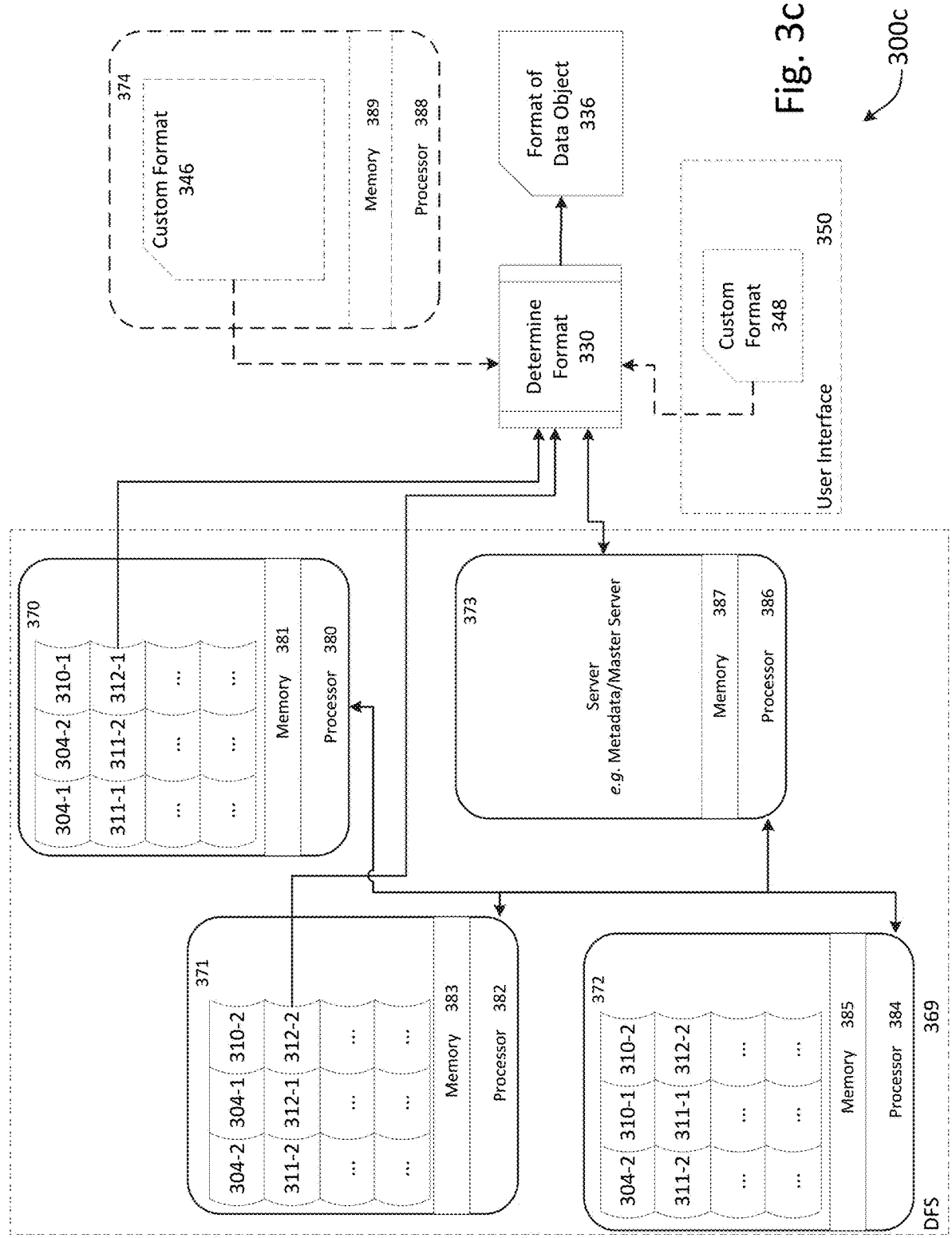

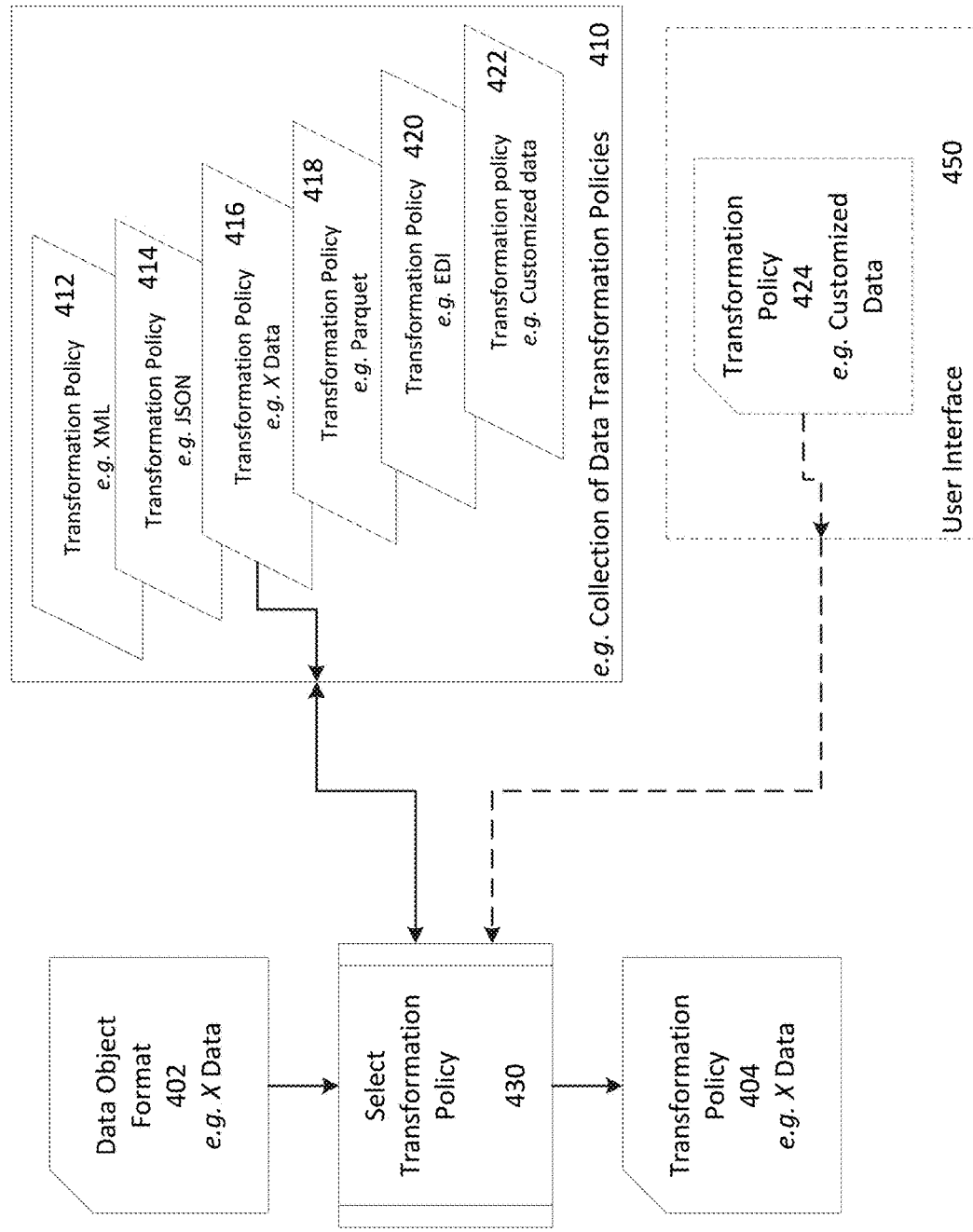

| Column | Datatype | Precision |
|---|---|---|
| .\car_inp_option (/cars/car/options/option) | | |
| . option (/cars/car/options/option) | string | 255 |
| id (/cars/car/options/option/@id) | string | 255 |
| .\car_inp_car (/cars/car) | | |
| id (/cars/car/@id) | string | 255 |
| maker (/cars/car/maker) | string | 255 |
| model (/cars/car/model) | string | 255 |
| doors (/cars/car/doors) | string | 255 |
| color (/cars/car/color) | string | 255 |
| type (/cars/car/engine/type) | string | 255 |
| size (/cars/car/engine/size) | string | 255 |

Fig. 6c

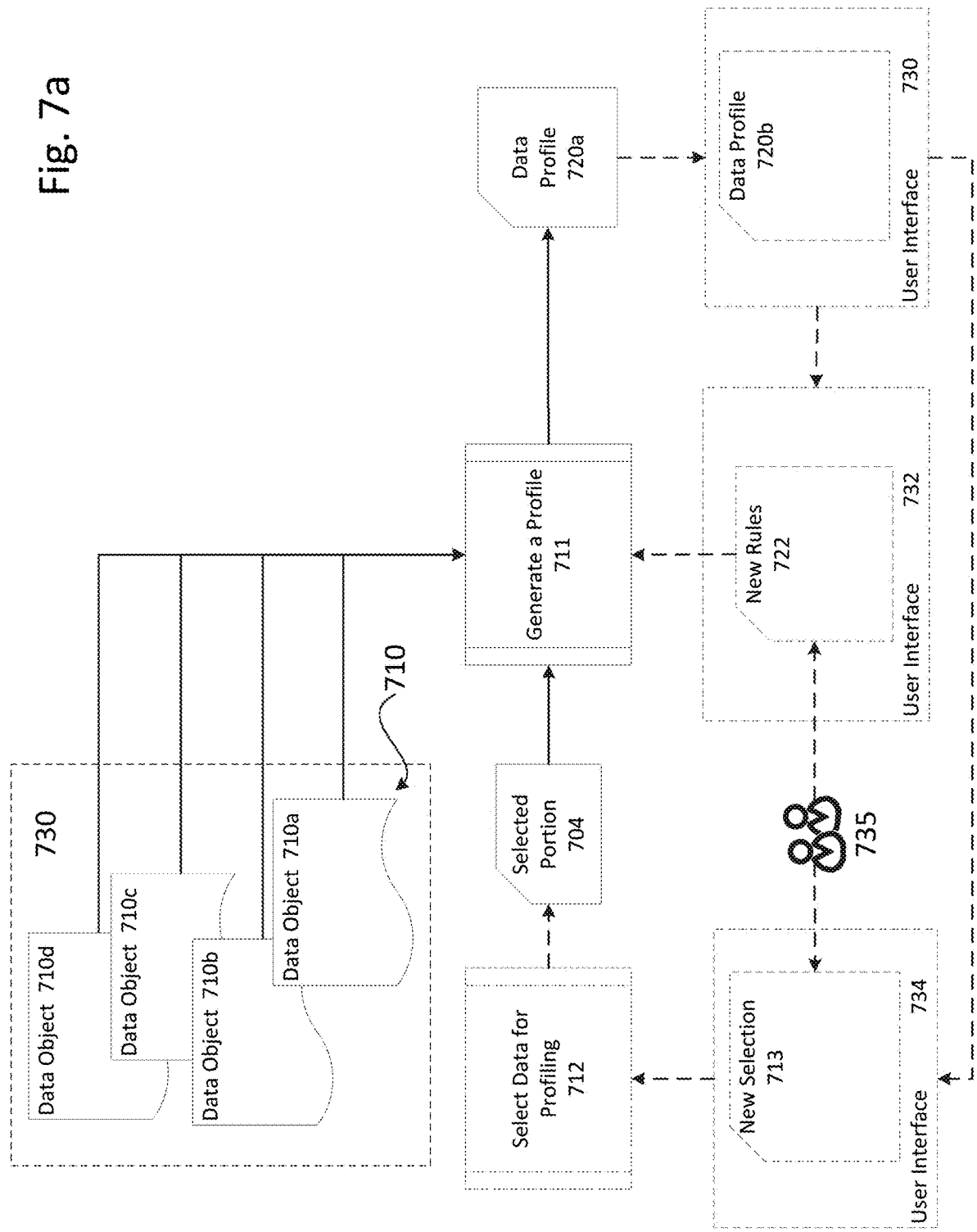

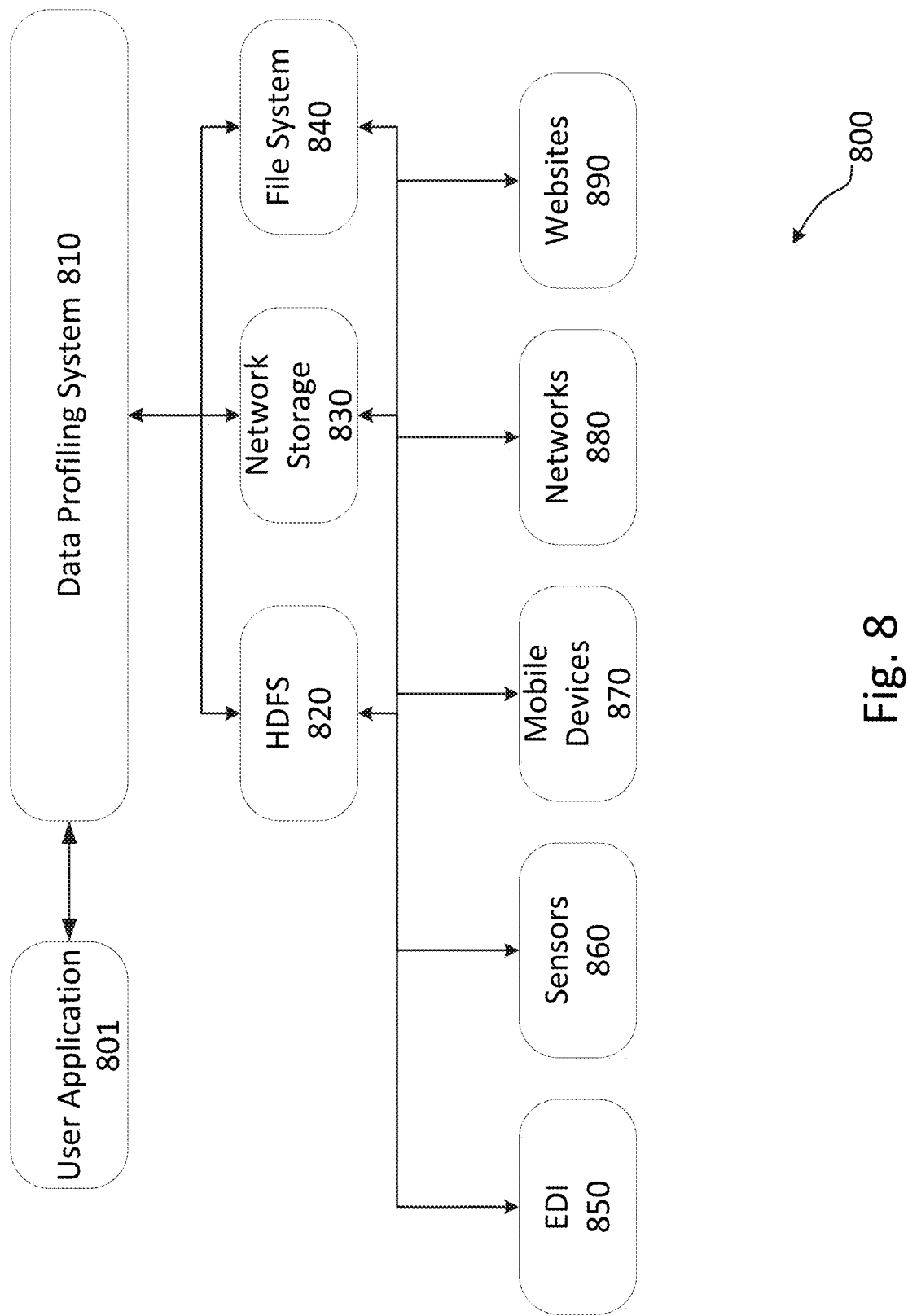

Fig. 11d

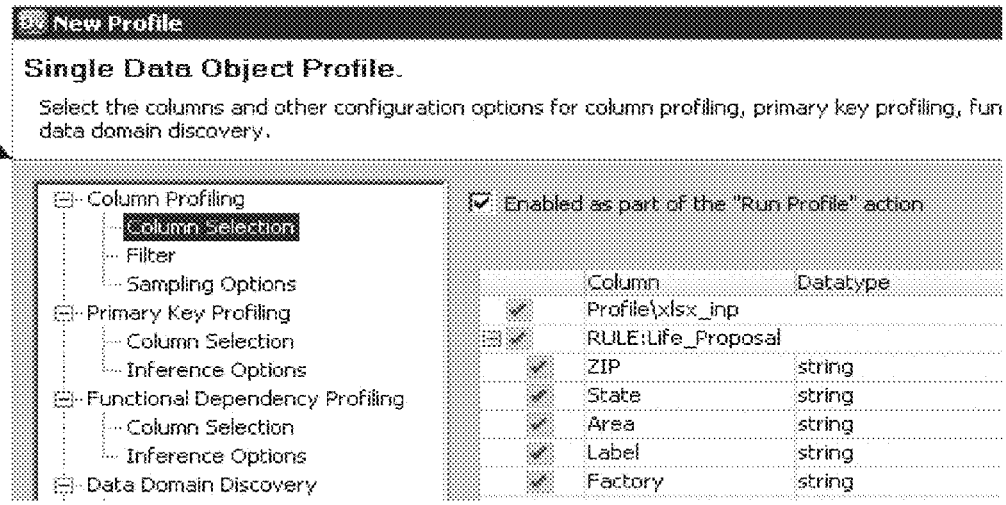

1103

```
<?xml version="1.0" encoding="WINDOWS-1252"?>
- <Experience>
   - <Life_Proposal>
      <ZIP>006</ZIP>
      <State>Puerto Rico</State>
      <Area>Puerto Rico</Area>
      <Label>Puerto Rico</Label>
      <Factory>1.000</Factory>
    </Life_Proposal>
   - <Life_Proposal>
      <ZIP>007</ZIP>
      <State>Puerto Rico</State>
      <Area>Puerto Rico</Area>
      <Label>Puerto Rico</Label>
      <Factory>1.000</Factory>
    </Life_Proposal>
   - <Life_Proposal>
      <ZIP>008</ZIP>
      <State>Virgin Islands</State>
      <Area>Virgin Islands</Area>
      <Label>Virgin Islands</Label>
      <Factory>1.000</Factory>
    </Life_Proposal>
   - <Life_Proposal>
      <ZIP>009</ZIP>
      <State>Puerto Rico</State>
      <Area>Puerto Rico</Area>
      <Label>Puerto Rico</Label>
      <Factory>1.000</Factory>
    </Life_Proposal>
   - <Life_Proposal>
      <ZIP>010</ZIP>
      <State>Massachusetts</State>
      <Area>Massachusetts, Other</Area>
      <Label>Massachusetts, other (010-016)</Label>
      <Factory>0.950</Factory>
    </Life_Proposal>
```

METHOD, APPARATUS, AND COMPUTER-READABLE MEDIUM FOR NON-STRUCTURED DATA PROFILING

BACKGROUND

Data profiling is an important tool in, for example, systems which may require a user to inspect or interact with extremely large data sets that must be analyzed computationally to reveal, among other things, patterns, trends and associations. It is often the case that these extremely large data sets are contained in a number of computer readable files that may be collocated, or may be located in numerous locations.

One way to simplify human interaction with such extremely large data sets is to generate a profile of the data contained within all the objects of a data set. In some cases, the data to be profiled may be contained in an extremely large number of small files containing small amounts of data represented as one or more data objects, or the data may be contained in a smaller number of extremely large files containing an extremely large number of data objects. The individual computer readable files themselves may be in any format, such as text files, stored in a file system within a computer operating system, or they may be stored in a distributed file system (DFS) such as the Apache Hadoop Distributed File System (HDFS) or the Google File System (GSF).

Extremely large data sets such as these are often referred to under the generalized term, "big data." Big data describes data sets that are so large or complex that traditional data processing applications are inadequate for handling, accessing and manipulating the data. Big data sets suffer from challenges relating to the analysis, capture, curation, searching, sharing, storage, transfer, visualization, querying, and updating of the data contained therein. Compounding these issues is that big data sets are typically growing rapidly, often because they are generated and gathered by cheap and numerous information collection devices, for example mobile devices, aerial remote sensing devices, software logs, cameras, microphones, radio frequency identification (RFID) readers, wireless sensors, and consumer devices that contain or more of the above. Other sources of "big data" are social media exchanges and web-based transaction facilities. The emerging concept of Internet of Things (IOT) will only add to the number of devices that collect data and the distributed nature of data storage. To derive meaning from such a "big data" system one typically needs considerable processing power, as well as appropriate analytical tools.

Beyond the size of modern big data sets, challenges are compounded by the fact that very little real world data is conveniently available as structured data represented in a canonical relational format or model. First, while a computer can more readily handle structured data in an efficient manner; humans typically deal with non-structured data, for example text strings, web pages, email, or ad-hoc spreadsheets, because humans rarely interact with information in a strict relational model in day-to-day life. Second, much of the data created today is stored in disparate files or locations by various systems designed to operate in an efficient manner when executing a particular task, without concern for conforming to canonical or accepted standard data formats (which may require additional programming or cause inefficiencies in the relevant system, for example in SCADA systems). Also, data describing similar things may be sensed by two separate systems which then store that data in two entirely different formats in two entirely different file systems.

Generally, data may fall into the categories of structured data, semi-structured data, and unstructured data. Structured data is data with a high level of organization, and such information can be seamlessly included in a relational database or other forms of tables. The canonical structured data is data stored in one or more relational tables, which are defined according to a well-defined schema. Structured data is also readily searchable by simple search engine algorithms or other search operations. Semi-structured data, and unstructured data, on the other hand is not easily collected or searched.

Known systems for profiling large data sets require first that semi-structured and unstructured data first be collected and stored in a relational database before it can then be analyzed or profiled. There are a number of known methods for mapping semi-structured data stored in a particular configuration into relational databases. Typically these fall into one of two categories: using a fixed mapping method to store semi-structured data in relational databases, or requiring a user to supply a mapping schema. Therefore, the lack of structure in such data makes compilation of the data into a time and energy-consuming tasks of storing all the data in a persistent table format which can then be subjected to analysis, or the generation of a mapping schema or a combination of these two tasks.

First, a schema must be created and supplied to a computer system, which relies on the schema to map the unstructured data to a structured format, and secondly all of the data must first be converted to a structured format irrespective of what data a user desires to profile. Also, these mapping schemas do not adapt to changes in the data, which may occur over time as the software and hardware generating the data changes or is upgraded; or if there is simply an error in the data giving rise to outlier data elements. Each of these hurdles becomes increasingly time-consuming as the data sets to be analyzed get larger and larger. While what is considered "big data" differs from user to user based on the computational abilities available or a user's needs, it will be appreciated that relational database management systems and available data statistics and visualization packages are insufficient for handling modern big data sets which may have extremely large numbers of data objects.

BRIEF DESCRIPTION OF THE DRAWINGS

FIG. 3c illustrates a functional flow block diagram for determining the format of a data object stored in a distributed file system in an exemplary embodiment.

FIG. 4 illustrates a functional block diagram for selecting a data transformation policy according to an exemplary embodiment.

FIG. 6c illustrates one embodiment of a user selection form for selecting data for profiling according to an exemplary embodiment.

FIG. 7a illustrates generating a profile of data according to an exemplary embodiment.

FIG. 8 is a functional block diagram of a system according to an exemplary embodiment.

FIGS. 11a-11f illustrate various user interfaces and intermediate steps in the profiling process according to one or more exemplary embodiments.

DETAILED DESCRIPTION

Figure 1A:
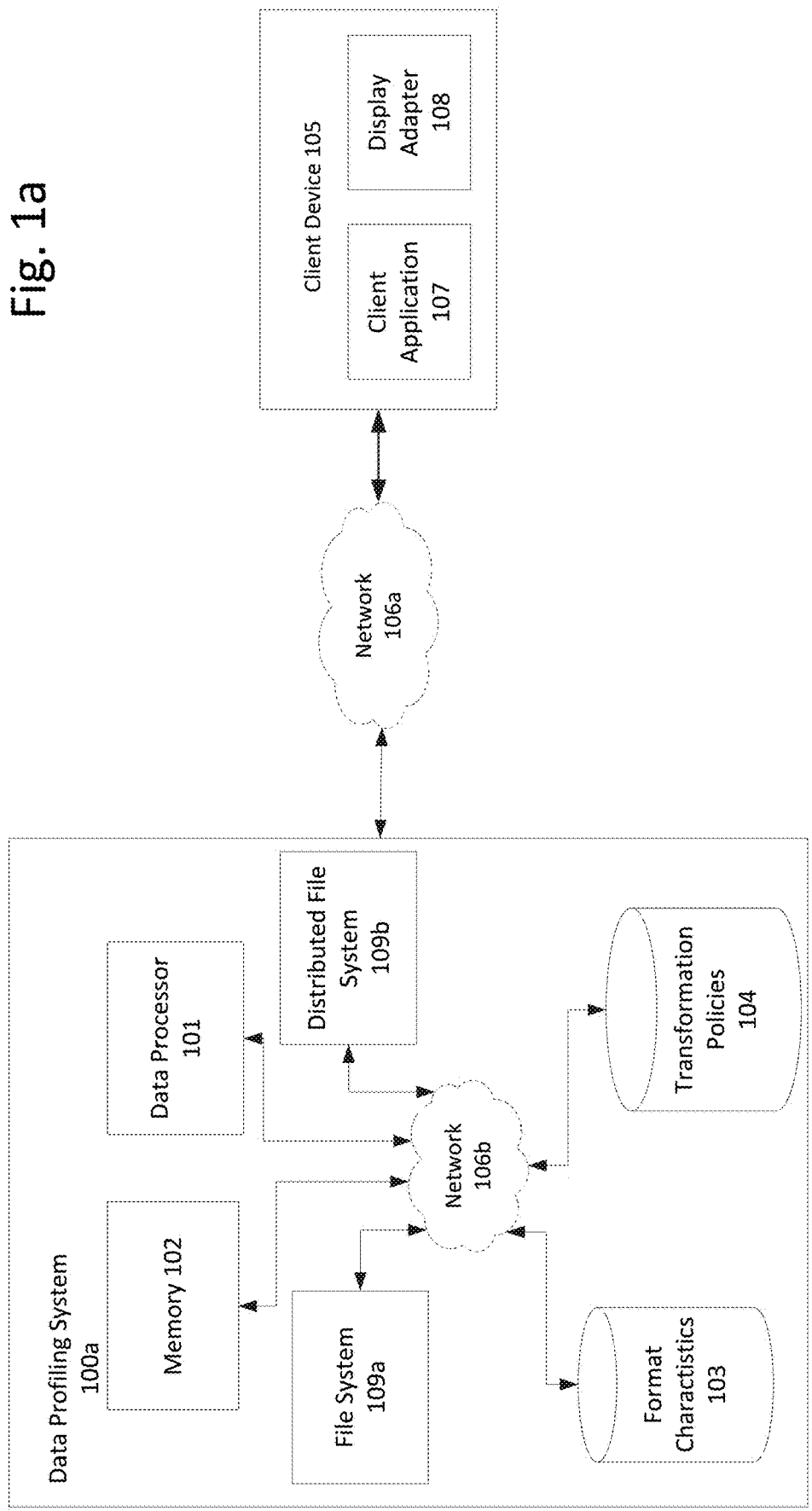
FIG. 1a illustrates a system environment for generating a data profile according to an embodiment.

While methods, apparatuses, and computer-readable media are described herein by way of examples and embodiments, those skilled in the art recognize that methods, apparatuses, and computer-readable media for generating masked data elements utilizing format preserving data masking are not limited to the embodiments or drawings described. It should be understood that the drawings and description are not intended to be limited to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "may" is used in a permissive sense (i.e., meaning having the potential to) rather than the mandatory sense (i.e., meaning must). Similarly, the words "include," "including," and "includes" mean including, but not limited to.

Improvements are needed in systems for profiling large amounts of data that precludes the need for first collecting all the data to be profiled and casting it into a structured format before the data can be analyzed.

In particular, due to the limitations of traditional systems and methods for analyzing and profiling large sets of data, an improved technique for generating and providing a desired data profile of an original set of data contained in one or more data objects is desirable. Applicant has discovered methods, apparatus, and computer-readable media for generating profiles of data contained in native data objects utilizing dynamic on-the-fly data profiling of semi-structured and unstructured data. Instead of requiring a predefined schema, or preloading of data objects into a relational database, a data transformation policy is applied to data objects as they exist after heuristically determining the format of the data objects. These properties are leveraged to achieve novel and unexpected results.

One aspect of the disclosed methods, media and systems includes data object characterization by analyzing or evaluating a data object format and comparing it to known data object types, and data transformations that generate a relational-type representation or model of the data based on data transformation policies. Another aspect of the disclosed methods, media and systems enables on-the-fly profiling of data contained in data objects without the need for first importing all the data to be profiled in a persistent relational format, for example in a relational database system.

By enabling on-the-fly profiling of data, the disclosed methods, media and systems further enable an iterative approach to data profiling allowing interactive user testing of the data profile and the insertion of new rules, conditions and policies during the profiling process. Another aspect of the disclosed embodiments allows for a profile to be generated without the need for supplying a schema or additional metadata. Another aspect of the disclosed embodiments allows for profiling of data contained in disparate locations without the need for physically moving or collecting all the data to be profiled in one location. Another aspect of the disclosed embodiments holds the relational-type representation or model in a memory commonly accessible by more than one processor to facilitate generation of on the fly relational representations of non-structured data objects from which a data profile may be readily generated in a parallel processing environment, for example a Mercury based processing framework. Another aspect of the disclosed embodiments provides the relational-type representation or model to a number of memories accessible by a number of processors organized in a parallel processing framework to facilitate generation of on the fly relational representations of non-structured data objects such that the data profile may be readily generated in a parallel processing environment. Another aspect of the disclosed embodiments scans the data objects and distinguishes between data objects having different formats and then applies the appropriate data transformation policy to a respective data object and transforms each object into one or more relational-type representations or models and profiles all the data in all the files regardless of the underlying file format.

Generally, semi-structured data and unstructured data are referred to as non-structured data, which generally refers to any data that is not structured according to a canonical or relational format. Unstructured data objects contain data that has not been organized into a formal format, or in which the format is readily known. For example, unstructured data includes standard documents generated by word processors, spreadsheets, images, audio files, and portable document format files. Semi-structured data objects have a level of organization, and possibly associated metadata, which allows elements contained within the data to be addressed, but where the organization is not a relational structure that lends itself to sophisticated analysis and addressing of data.

Examples of semi-structured data are hierarchical data formats, like XML, JSON, ASN.1, COBOL, Avro, Parquet, and industry standard data objects such data stored in electronic data interchange ("EDI") format, the Deposit Trust & Clearing Corporation's ("DTCC") National Securities Clearing Corporation ("NSCC") messaging format standards, Health Level 7 International ("HL7") data format standards, Financial products Markup Language ("FpML") message standard, and Society for Worldwide Interbank Financial Telecommunication ("SWIFT") data message. Generally, semi-structured data does not conform to the formal structure associated with relational databases or other data tables, but instead contains tags or other markers to separate semantic elements and enforce hierarchies of records and fields and elements within the data. Semi-structured data formats can be complex, having many different levels and include a very large number of nodes that are linked within and between levels. Furthermore, portions of a hierarchical structure can be very different structurally. As a result, profiling of hierarchical structures can be complex, cumbersome and computationally inefficient.

It will be appreciated that unstructured data may be converted to semi-structured data. For example a Microsoft™ Word or Excel document, or a portable document format file (PDF), or a Google doc, can be tagged with metadata tags in the form of keywords or other metadata that represents the document contents and enables addressing of data elements within the document. It will also be appreciated that such a tagged document format still lacks the complex organization of a relational database and is therefore not a structured data object. Also, scripts may also be relied upon in order to recognize and tag an unstructured document thereby effectively converting it to a semi-structured format. Scripts may also be used to transform an unstructured data object into a semi-structured data object. Once converted into a known semi-structured data object the data can then be transformed using a known data transformation policy.

The disclosed methods and systems may involve analyzing one or more sample data objects selected from, potentially, an extremely large number of data objects in order to determine the format of the data contained in each data object. The disclosed method may also involve applying rules, transformation policies and metadata in order to generate a model of the data structure, or format, of the data contained within the large number of data objects. Such a model may approximate a structured format, for example similar to a relational database schema of the data. This model may then be held in memory accessible by one or more data processing devices which may then generate a profile of the data based on the model. This allows improved performance of the computing environment when profiling the data, by accelerating the profiling process while precluding the necessity converting and storing all of the data to be profiled in a persistent relational format before profiling. This also allows for an interactive and iterative user experience when working with the data, as new rules or modifications to the model can be performed in real time to test the outputs on subsets of the large number of data objects before profiling all of the desired data objects. The disclosed method also allows the system to adapt to changes in the underlying data objects, so long as the structural format remains the same.

The disclosed embodiments are not limited to a particular type of data object or a particular type of data type. It will also be appreciated that the various transformations of data during the course of storing, retrieving, processing, communicating etc. will all be handled by the various embodiments of the data profiling system disclosed herein.

Though the description involves examples involving specific demonstrative examples of how a profile may be generated based on data contained in one or more specific data objects according to one or more embodiments, the disclosed methods, systems, and computer-readable medium can also be utilized to generate profiles of data contained in any type of data object having a known or discernable format.

FIG. 1a illustrates an exemplary system environment for generating profiles of data contained in one or more data objects in accordance with the present invention. The overall system may include a profiling system 100a, a client device 105, and optionally one or more networks, for example 106a and 106b. If present, client device 105 may interact with profiling system 100a via network 106a, otherwise the data profiling system may reside upon or be directly coupled to client device 105, which may be any suitable computing device. In other embodiments, more or less components than those indicated in FIG. 1a may be used. For example, a user may perform the actions described herein using a display monitor receiving a display signal from display adapter 108; or a user may interact with the data profiling system 100a using a display monitor of the data profiling system 100a instead of interacting with the mapping system 100 via a network such as network 106a using client device 105.

In another example, the components of data profiling system 100a may optionally interact with each other via an internal system network 106b, or optionally networks 106a and 106b may be the same network, or optionally the system 100a components may be interconnected via direct electrical connections such as across a data bus residing in one or more motherboards. It will also be appreciated that data processor 101 may comprise one or more software modules or programs executed by one or more physical or virtual processors relying on memory 102 which may be one or more different memory objects. Likewise, file system 109a, distributed file system 109b, and the data repositories storing the format characteristics 103 and transformation policies 104 may be unitary objects or distributed objects comprising multiple respective objects, each of which may communicate directly, via a network or a combination of the two.

Figure 1B:
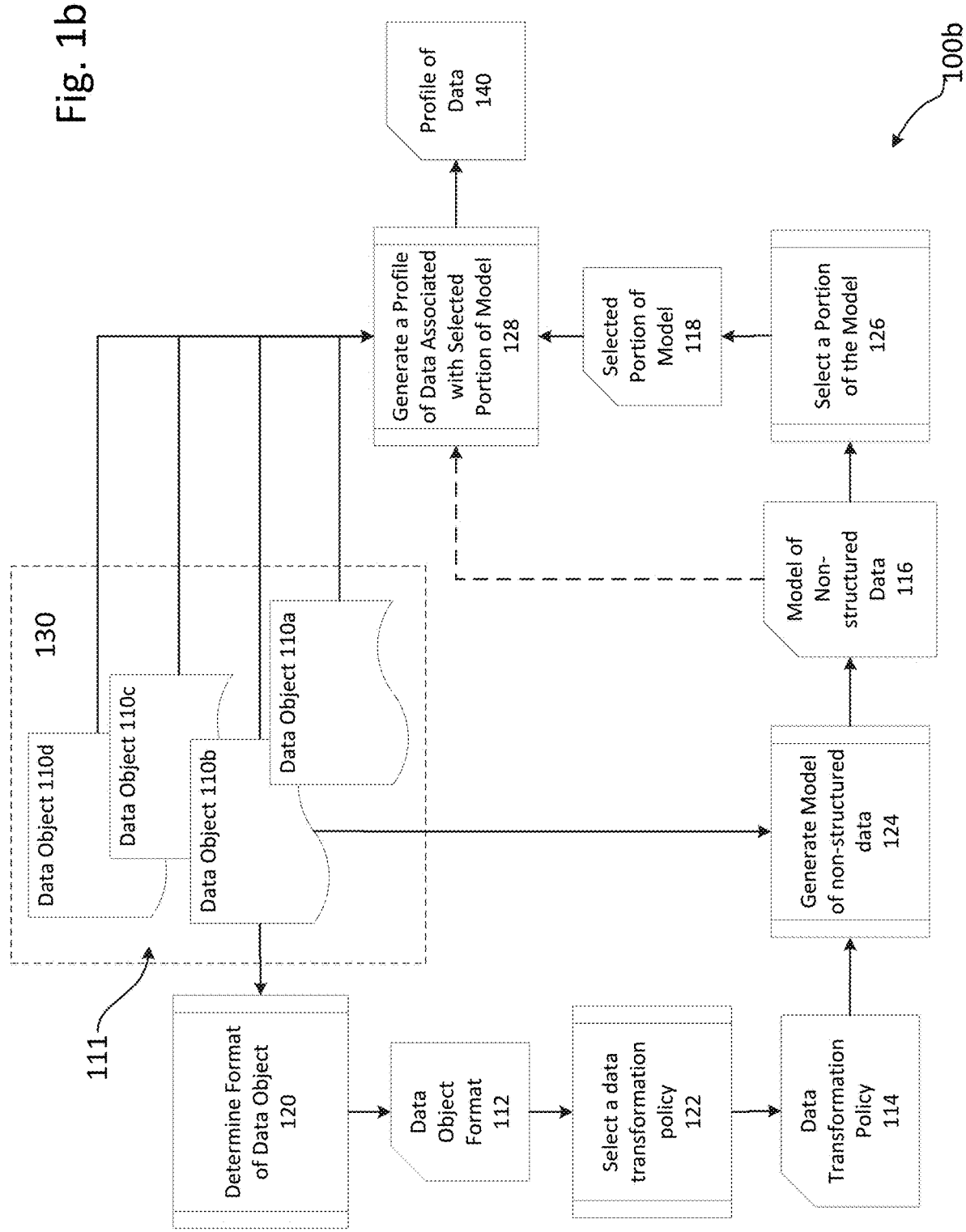
FIG. 1b illustrates a functional flow block diagram for generating a profile of non-structured data in an exemplary embodiment.

FIG. 1b illustrates an example of how system 100a may generate a profile of data 140 from a multitude of data objects 111 by way of a functional flow block diagram 100b of an exemplary embodiment. Here the multitude of data objects 111 includes a number of individual non-structured data objects 110a, 110b, 110c, 110d residing in data repository 130. Data repository 130 may be any suitable location for storing data objects, for example, it can be a file structure 109a, a distributed file system 109b, or a collection of one or more locations. The location of the data objects is supplied to system 100a for example by a user or another computer executed script, or from a configuration file referenced by data processor 101. The multitude of data objects 111 may include an extremely large number of data objects. The multitude of data objects 111 depicted in FIG. 1 may be of a particular type or possess a particular format representing data in a non-structured way, for example the data may be represented in a semi-structured format or in an unstructured format. The multitude of data objects may be represented individually in individual computer files, for example an extremely large number of XML files each containing an XML data object; or alternatively the multitude of data objects may be stored in one file containing an extremely large number of data objects, for example a file containing a multitude of JSON data objects. It will be appreciated that these file types and data formats are for exemplary purposes.

First, one or more sample data objects, for example data object 110b, is selected from the multitude of data objects 111 by data processor 101 which determines the format of the sample data object(s) 120, to obtain a data object format 112 by, for example, referencing predetermined format characteristics 103. The data object format 112 may be one of any semi-structured data formats or unstructured data formats. For example, the data object 110*b* may have a data format 112 that may be an XML format. In order to determine 120 the format of the data object, the data object 110*b* is analyzed or studied to identify discernable features identified in the format characteristics 103. For example, where the first non-empty character of data object 110*b* is the < character, the format characteristics 103 may indicate that the data contained within data object 110*b* is formatted in a standard XML format; or, if the first non-empty character in the input file is [ or { format characteristics 103 may indicate that the data is formatted according to a JSON file format; or, if the first four bytes of the input file contain a parquet magic number format characteristics 103 may indicate that the file is a parquet file. It will be appreciated that any file having a data organized in a particular format can have an identifiable structure characterized in a set of format characteristics 103 that may be determined based on an analysis performed by data processor 101.

In an exemplary case the case, data object 110*b* may contain data organized according to a XML file format such that the data within the data object is formatted in a hierarchical structure. A hierarchical data structure, like XML, includes nodes, or elements, representing information that are interconnected with each other. A node may be a simple node or a complex node. A simple node is a node that contains only a single data element, for example <ZIP>006</ZIP> is a simple node, which may be the basic data element within such a data object. A complex node may contain other nodes, for example,

```
<Life_Proposal>
    <ZIP>010</ZIP>
    <State>Massachusetts</State>
    <Area>Massachusetts, Other</Area>
    <Label>Massachusetts, other (010-016)</Label>
</Life_Proposal>
``` is a complex node. A repeating node is a node that can have multiple occurrences. For example, "Life_Proposal" is a complex node that repeats multiple times within the complex node "Experience" which occurs in an XML data object as follow:

```
<?xml version="1.0" encoding="WINDOWS-1252"?>
<Experience>
    <Life_Proposal>
        <ZIP>010</ZIP>
        <State>Massachusetts</State>
        <Area>Massachusetts, Other</Area>
        <Label>Massachusetts, other (010-016)</Label>
        <Factory>0.950</Factory>
    </Life_Proposal>
    <Life_Proposal>
        <ZIP>017</ZIP>
        <State>Massachusetts</State>
        <Area>Cambridge</Area>
        <Label>Massachusetts, Boston (017-024)</Label>
        <Factory>0.950</Factory>
    </Life_Proposal>
    <ID>1234</ID>
</Experience>
```

The "Experience" node also contains a simple node "ID." As this data object begins with the <character, determining the format of a data object 120 recognizes that the format of the data object, for example data object format 112, is an XML data object as may be described by format characteristics 103.

Having obtained a data object format 112, the data object format 112 forms the basis for data processor 101 selecting a data transformation policy 122 from a collection of data transformation policies 104. A data transformation policy, for example data transformation policy 114, is a predefined policy that describes how to model a non-structured data format in a relational-like model that can be represented in a manner similar to a relational-type schema without any knowledge of the data itself. For example, a data transformation policy such as data transformation policy 114 may be an XML, data transformation policy which causes data processor 101 to evaluate XML nodes used in formatting the data in an XML data object to identify similar simple nodes as data elements. The data transformation policy 114 may instruct the data processor 101 to group simple nodes based on their location within the structure to form row-like elements in a resulting relational-type model, which may for example be presented to a user in convenient list like format. Such a model may appear similar to a relational database schema describing a table, where each row of such a schema describes a column of a relational table. Thus in the relational-type model, each grouping of nodes represented in a row is analogous to a column described in a relational database schema. Additionally, the data transformation policy may instruct data processor 101 to perform some characterization of the data elements contained within the sample data object by analyzing each data element in the groupings of the data elements. For example, again in the context of an XML format, if all the elements within a simple node, or data element, are positive whole numbers, as with <ZIP> above, then the data transformation policy may determine that the data elements are all of type INT; whereas if all the elements within a simple node contain combinations of letters and numbers, the data transformation policy may determine that the data elements are all of type string.

The data transformation policy 114 may then be applied to the sample data object, for example data object 110*b*, in order to generate a model of the non-structured data 124 resulting in the model of non-structured data 116. For example, if data transformation policy 114 is an exemplary XML data transformation policy, and data object 110*b* contains the XML data described above, the following relational schema-like model may result:

| /Experience/Life_Proposal/ZIP | \|\| | type:INT |
| /Experience/Life_Proposal/State | \|\| | type:STRING |
| /Experience/Life_Proposal/Area | \|\| | type:STRING |
| /Experience/Life_Proposal/Label | \|\| | type:STRING |
| /Experience/Life_Proposal/Factory | \|\| | type:DBL |
| /Experience/ID | \|\| | type:INT |

In this example, each simple node is recognized as a data element, and repeating simple nodes are grouped such that each grouping is represented by one row of the resulting model. It will be appreciated that each data element contained within a simple node may be further analyzed to attempt to identify characteristics of the data, for example the precision necessary to represent each grouping of the datatype of the elements represented by a grouping. For example, if every ZIP element is a three digit INT, the system may determine that the necessary precision is three decimal numbers, which information can be used to optimize the subsequent sub-processes.

From this model 116, the data desired to be profiled may be selected 126. It will be appreciated that selecting a portion of the data 126 may be performed by a user, for example via a client application 107; or alternatively, by a computing device executing instructions that would perform a selection on the resulting model. This selection operates to filter the data to be profiled. For example, such instructions may be in the form of a script or a form of machine implemented intelligence.

For example, individual rows of the exemplary model above may be selected to indicate that all data contained within all the multitude of data objects 111 associated with the selected rows will be profiled. That is, if the row corresponding to "/Experience/Life_Proposal/Label" is selected to be profiled, data processor 101 will include each data element within each instance of a simple node "Label" contained in a complex node "Life_Proposal" contained in each complex node "Experience" occurring in one or more of the multitude of data objects 111 will be included in the generated profile, for example profile 140.

Once a selection 118 is made, the system 100 may generate 128 a profile 140 associated with the selected portion of the model 118. The selected portion of the model 118 may include one or more rows, or portions, of the generated model 116, and contain sufficient information regarding the data and data format of the multitude of data objects 111 that the system 100 can extract and analyze the desired portions of the data from each of the multitude of data objects 111 for profiling. Alternatively, both the generated model 116 and the selection 118 may be relied upon to generate a profile 128.

In order to generate 128 a profile 140 based on the selection 118, the selected portion of the model 118 is placed in a memory location, for example memory 102, that is accessible by one or more processors executing data processor 101, which are also logically coupled to repository 130. Repository 130 may, for example, be stored in file system 109a or distributed file system 109b, or a combination of the two 109a and 109b. Each of the multitude of data objects 111 may be retrieved by system 100a and the selected portion of the data contained therein may be extracted and analyzed by data processor 101 in order to generate profile 140. In this way, it will be appreciated that none of the multitude of data objects 111 need first be persistently stored in a relational type database in order to generate the profile. Also, in this way, a selected portion of the multitude 111 may be profiled without the need to process the entire multitude 111, which may otherwise require processing of extremely large numbers of data objects. This may be useful for example to test the generation 128 of profile 140 in an iterative fashion on portions of the data which may be transformed on the fly, without requiring that all, or any, of the data objects be processed into a relational format before testing is possible. This also allows for modifications to the profiling process 100b to be made and tested in an iterative fashion on-the-fly. Such modifications may include, among other things, modifications to the transformation policy 114, the model itself 116 or the selection 118 or the supplying additional rules or conditions. These modifications may be carried out via the client application 107.

The profiling system 100a is hosted on a computer system that includes one or more processors, memories, storage and input/output controllers. Typically, the computer system used for hosting the profiling system 100a is a server class system. The computer system may comprise multiple computer systems organized to process information in parallel processing framework or environment, for example a Hadoop Map/Reduce framework, or an Informatica Blaze system relying on HDFS and Apache Yarn.

Figure 2:
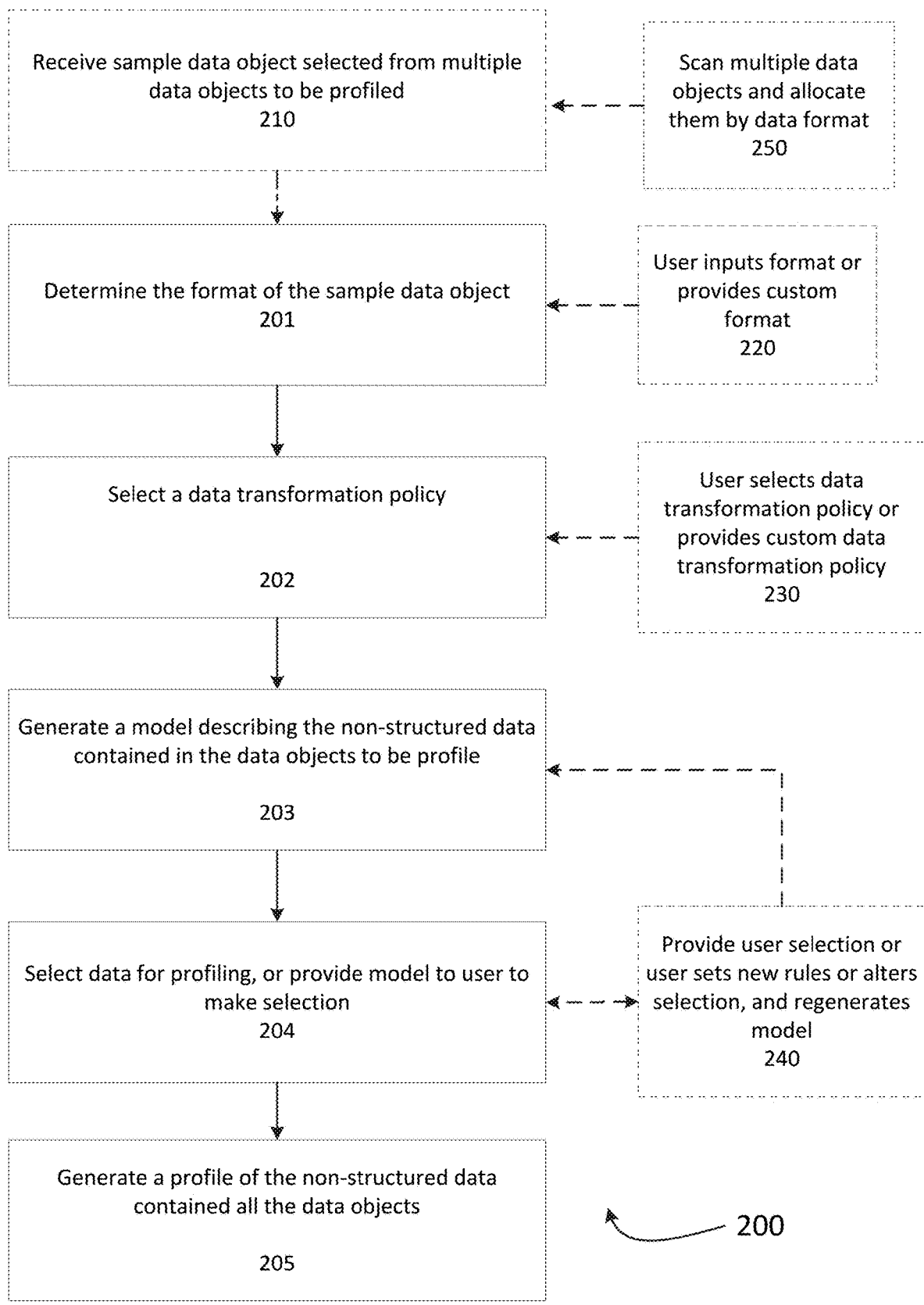
FIG. 2 illustrates a flowchart for a method for generating a profile of non-structured data according to an exemplary embodiment.

FIG. 2 illustrates a flowchart 200 for a method for generating a profile of one or more data objects containing non-structured data. The method may for example be performed by one or more computing devices. At step 201, a sample data element is analyzed in order to determine how the data contained in the data object is formatted. It will be appreciated that the data object may first be received 210 into a computing device before the format is determined 201. If the format of the data object is not previously known, the format may be supplied to the computing device for example by a user supplying or specifying the format 220 of the data object. The data objects may also optionally include a number of data objects of varying type; for example a group of data objects may include JSON objects and XML. The method may include a scanning step 250 during which the data objects are first scanned to identify different data object types, and then the following steps may be implemented for each data object type either sequentially or in parallel. After determining the format of the sample data object 201, a data transformation policy is selected 202. This data transformation policy may be selected 202 automatically, or a user, or a computer implemented method, may select a data transformation policy 230 and supply such that selection 202 relies on selected 250. It will be appreciated that this may be a previously known transformation policy or a newly supplied custom policy. Having selected a transformation policy 202, the method continues by generating a model 203 describing the non-structured data contained within the data objects to be profiled. Based on the generated model, the method continues by selecting a portion of the model for profiling 204. This selection step 204 may be accomplished by a user, a script, or another machine based intelligence. During steps 203 and 204, the user may also provide additional rules, selections, conditions or restrictions 240 to be applied during profiling, which may require regeneration of the model. Once a selection has been made during step 204, the method continues by generating a profile of the non-structured data contained in all of the data objects 205 intended to be profiled.

It will be appreciated that one or more of the distinctly illustrated steps in FIG. 2 may occur simultaneously, where for example a user input, or a configuration file, may include data relevant to multiple steps. For example, in some cases a user input at step 220 may include information that indicates both the format of the data and include the transformation policy, reducing steps 201, 202, 220 and 240 to a single step. Consider a situation in which a data object is analyzed and at step 202 it is recognized as an XML data object, because the first character is "<." Further analysis at step 202 may further identify the data object as an XML having a particular XML hierarchy, which may be recognized by the various nodes in the XML data object; thus, for example, step 202 may recognize the particular data object as an XML object having a known XSD, this would necessitate selection of a particular transformation policy at step 203. That is, the transformation policy would be associated directly from the XSD, where the XSD explicitly describes how to model the data in a relational type model. Further consider, that prior step 201, a user simply supplies the system 220 with a particular XSD, for example:

```xml
<xs:schema xmlns:xs="http://www.w3.org/2001/XMLSchema">
  <xs:element name="Experience">
    <xs:complexType>
      <xs:sequence>
        <xs:element ref="Life_Proposal" maxOccurs="unbounded"/>
        <xs:element ref="ID"/>
      </xs:sequence>
    </xs:complexType>
  </xs:element>
  <xs:element name="Life_Proposal">
    <xs:complexType>
      <xs:sequence>
        <xs:element ref="ZIP"/>
        <xs:element ref="State"/>
        <xs:element ref="Area"/>
        <xs:element ref="Label"/>
        <xs:element ref="Factory"/>
      </xs:sequence>
    </xs:complexType>
  </xs:element>
  <xs:element name="ZIP" type="xs:byte"/>
  <xs:element name="State" type="xs:string"/>
  <xs:element name="Label" type="xs:string"/>
  <xs:element name="ID" type="xs:short"/>
  <xs:element name="Factory" type="xs:decimal"/>
  <xs:element name="Area" type="xs:string"/>
</xs:schema>
```

If the user also informs the system that the data objects to be profiled are all described by the XSD, in this case, the format is immediately known as is the transformation policy, which may be the XSD file itself; thus steps 201, 202, 220 and 230 are all collapsed into a single step of supplying the XSD by a user. This XSD file may then be stored, and future data objects having the same XML format can immediately be recognized without user input and profiled according to the disclosed system.

Figure 3B:
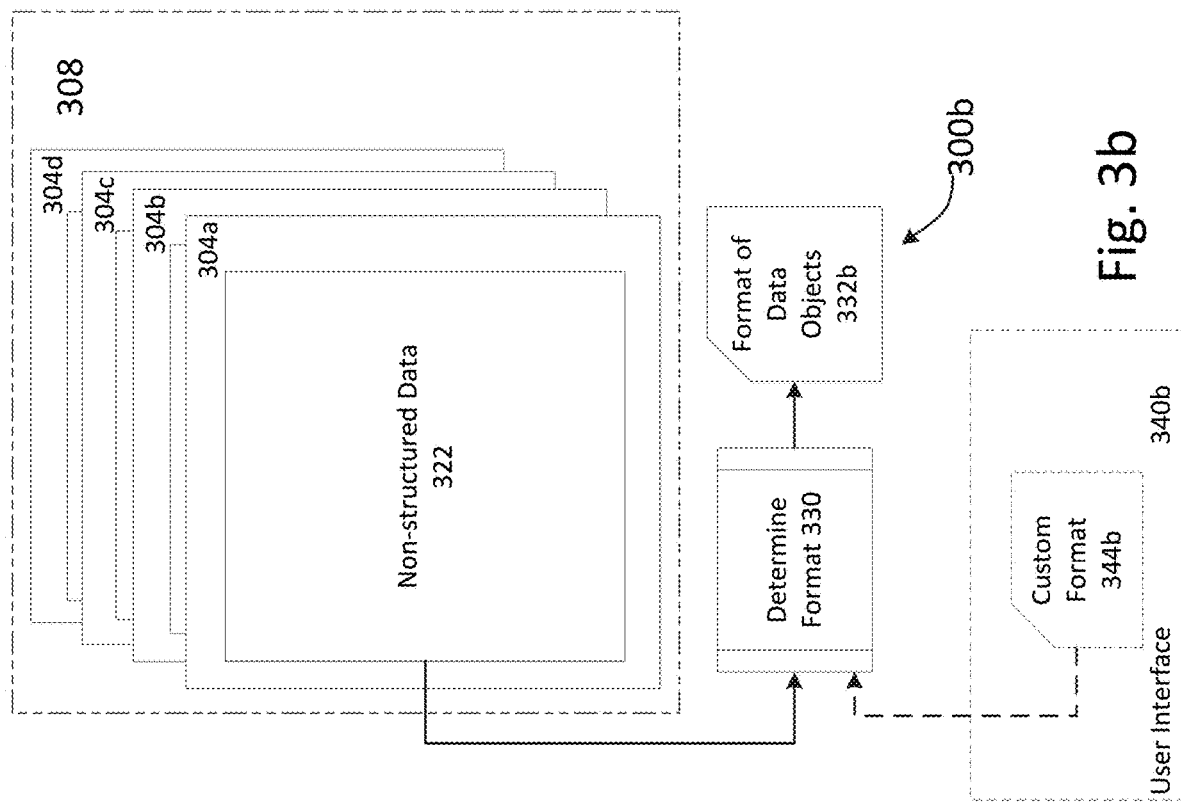
FIG. 3b illustrates a functional flow block diagram for determining the format of another data object in an exemplary embodiment.
Figure 3A:
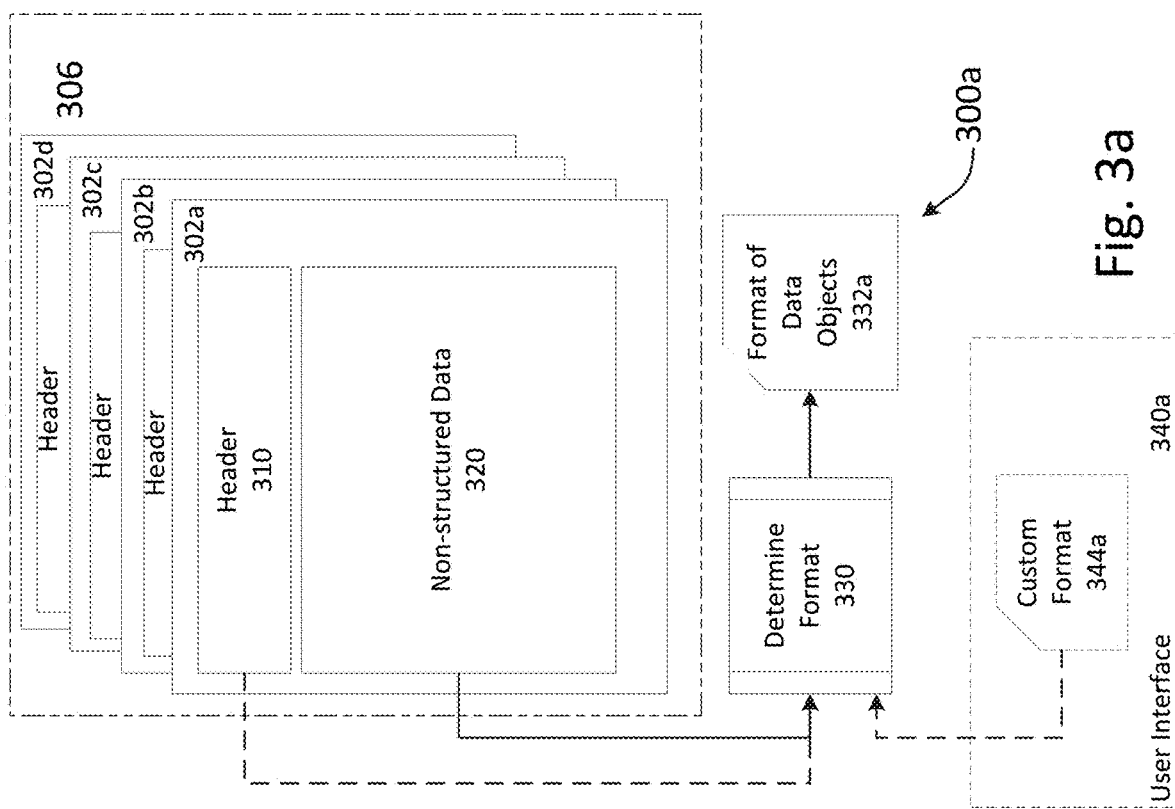
FIG. 3a illustrates a functional flow block diagram for determining the format of a data object in an exemplary embodiment.

FIGS. 3a, 3b and 3c illustrate examples of a system's process 300a, 300b, 300c of determining a format 330 of data objects located in one or more locations 306, 308, 369 in accordance with the disclosed embodiments. The system may determine the format 330 of various types of data objects, and may rely on any suitable distinguishing feature of the data objects. This may be performed for example by data processor 101 executing on one or more computer processors in system 100a. For example, some files 304a, 304b, 304c, 304d may have distinguishing features in the format of the data itself 322, whereas in other cases data files 302a, 302b, 302c, 302d may contain unique header information 310 or other contain metadata as well. In other cases, the files may be stored in a distributed file system 369 as chunks of data 304-1, 304-2, 310-1, 310-2, 311-1, 311-2, 312-1, 312-2 that are stored across various different storage devices 370, 371, 372 according to scheme managed by a master server 373 which may contain various metadata describing the files to be profiled, for example file 312 comprising chunks 312-1, 312-2.

File 312 when assembled may contain data formatted in a particular way just as files 302a, 304a. Once a sample file is selected, for example 302a, 304a, 312, the process of determining a format 330 of the data objects within the file may rely on predetermined format characteristics, for example format characteristics 103, or any suitable heuristic approach to determine the data format 332a, 332b, 336. When a data object such as 302a, 304a, 312 is analyzed but the format cannot be determined, a custom format 344a, 344b, 348 can be supplied in order to determine the format 330. This custom format 344a, 344b, 348 may be supplied by a user via a user interface 340a, 340b, 350; alternatively, a custom format 346 may be supplied by a computing device, for example 374. The process of determining the format 330 may be performed by any computing device, for example determining a format 330 may be performed by any suitable processor, for example 380, 382, 384, 386, 388 operatively coupled to memory 381, 383, 385, 387, 389, and executing for example data processor 101. Once an unknown data format is identified by a custom format, it may be stored for future use, along with the stored format characteristics 103, in order to automatically identifying the previously unknown format.

Referring back to FIG. 2, optionally step 201 may require that a sample data object be submitted to the system, or receive by the system 210, and as discussed above, a user may explicitly provide or identify a format 220. Following step 201, a system implementing method 200 selects a data transformation policy 202 to be applied to the sample data object. Again, a user may optionally explicitly supply the data transformation policy 230.

FIG. 4 illustrates the process of selecting a transformation policy 430 by way of a functional block diagram 400 according to an exemplary embodiment. The system selects a transformation policy 430 based on a determination of the format of a data object 402. This may be performed for example by data processor 101 in system 100a. This data transformation policy, for example transformation policy 416, may be selected from a collection of data transformation policies 410. This collection of data transformation policies 410 may include a data transformation policy for any known non-structured data format. The collection 410 may, for example, include data transformation policy pertaining to semi-structured, or hierarchical, data formats like XML 412 or JSON 414, or it may refer to industry standards such as EDI 420, or Parquet files 418, or policies 422 pertaining to flat files, text files, spreadsheets or any other unstructured data.

Optionally, a user may supply a customized data policy 424 via a user interface 450 for new or unknown data formats; and, it will be appreciated that such a user supplied customized data transformation policy can be stored for later use as part of the collection of data transformation policies 410. A stored customized transformation policy may also be associated with identifiable formatting characteristics of such a new or (previously) unknown data format. In this way, future profiling tasks may automatically identify the newly stored format, for example at step 201, and the newly stored data transformation policy can be automatically selected at step 202.

Generally, a data transformation policy includes instructions that describe how a processor may transform one type of formatted data to another type of formatted data. These instructions may be in the form of computer readable scripts; or they may include metadata describing a particular data format or datatype. A transformation policy may for example be supplied to data processor 101 of system 100a to be executed during subsequent steps in the profiling process.

The collection of data transformation policies 410 may be stored in store 104 of system 100a. It will also be appreciated that the collection of data transformation policies 410 may be stored in any suitable computer storage from which sub-process 430 is able to access them. Upon selecting a transformation policy 430, the system obtains the desired transformation policy 404 which is relied upon in step 203.

In an exemplary case, as shown in FIG. 4, if after the sample data object is analyzed and its data format is determined to be, for example, of type X, the system selects 430 transformation policy 416 corresponding to data object format X from the collection of data transformation policies 410. The transformation policy associated with type X data is selected as transformation policy 404, which may then be supplied to subsequent sub-processes. If type X data format contains data in an unstructured data format, transformation policy 416 may include a script or metadata that may first be applied to transform the unstructured type X data into a hierarchical format, for example, see for example FIGS. 11*a*, 11*b*, 11*c*, or it may contain a script or other instructions that generate a relational-type model directly from the type X data.

Referring back to FIG. 2, once a transformation policy is selected 202, a model is generated 203 by applying the data transformation policy to the sample data object. Optionally, a user may supply or provide 240 additional rules, or configuration options, to the transformation policy based on the goals of a particular data profiling task.

Figure 5A:
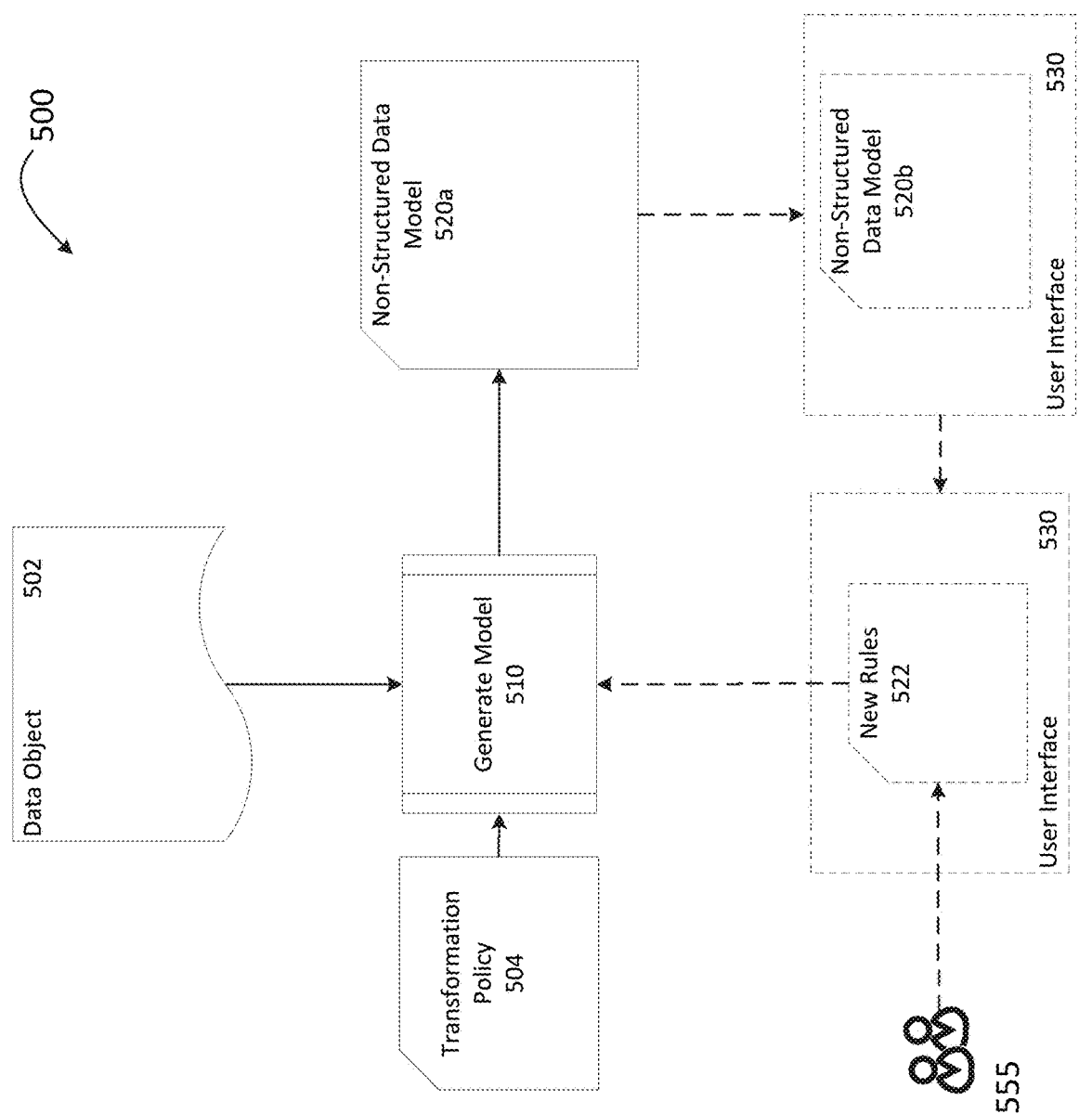
FIG. 5a illustrates a functional flow block diagram for generating a model of the non-structured data contained in a data object according to an exemplary embodiment.
Figure 5B:
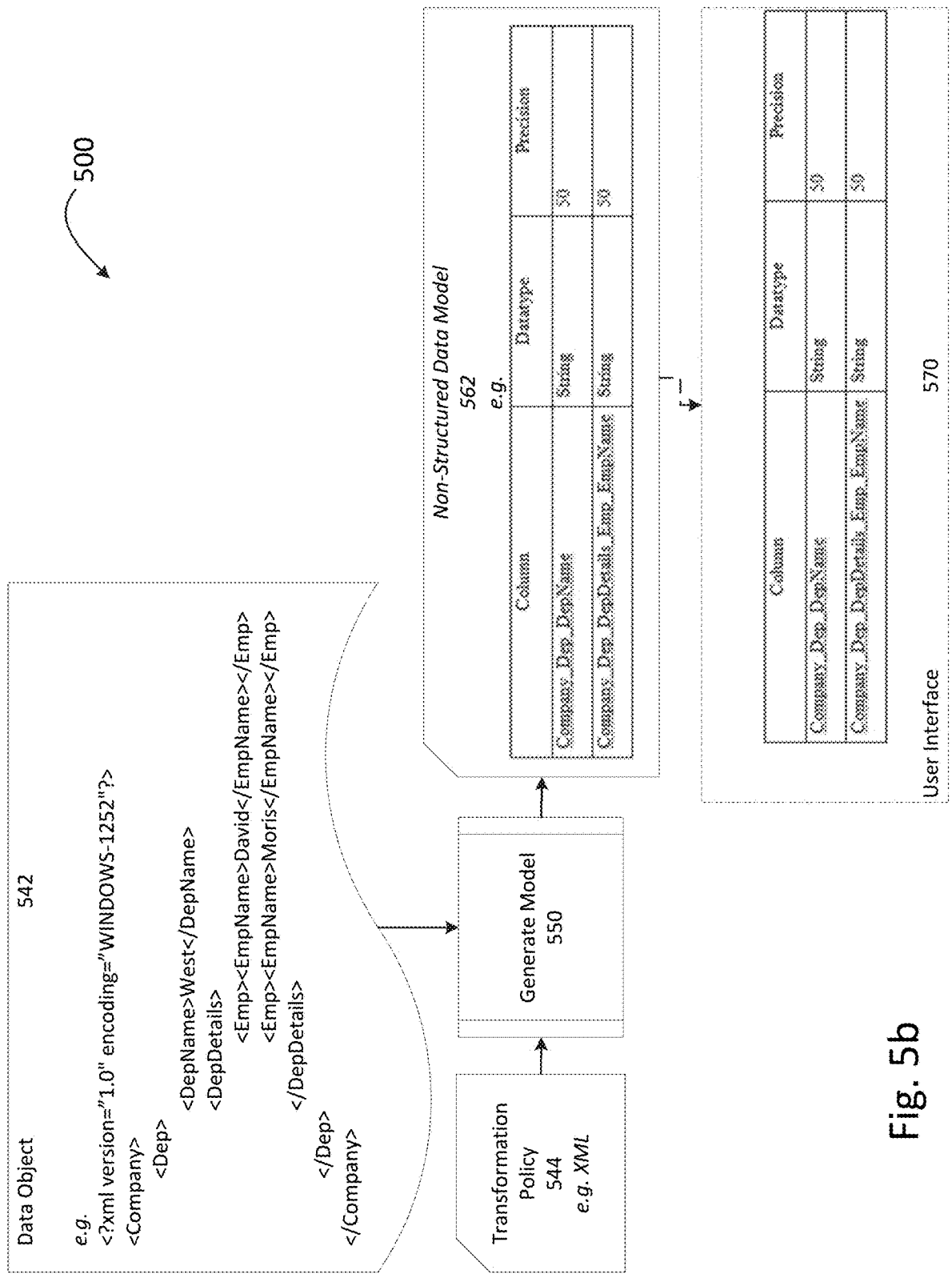
FIG. 5b illustrates a functional flow block diagram for generating a model of exemplary non-structured data according to an exemplary embodiment.

FIGS. 5*a* and 5*b* illustrate the process of generating a model 510 of the data object by way of a functional block diagram 500 according to an exemplary embodiment. Having obtained a transformation policy 504 associated with the data object 502, a non-structured data model 520*a* is generated 510. This may be performed for example by data processor 101 executing on one or more computer processors in system 100*a*. The non-structured data model 520*a* may also be visually represented as data model 520*b* on a user interface 530. A user 555 observing the resulting model 520*b*, may then supply additional rules, or other configuration options, in an iterative fashion until a desired model 520*a*, 520*b* is achieved. FIG. 5*b* illustrates generating a model 550 of a sample data object 542, which is an XML type data object. Sub-process 550 accepts both the previously identified transformation policy 544 and the data object 542, and then applies the policy 544 to the data object 542 sub-process 550 to obtain a data model 562 of the non-structured data contained in the XML formatted data of data object 542. This model may optionally be visually depicted on a user interface 570. Example data object 542 contains an XML data object containing a complex node "Company" containing a complex node "Dep" that contains a simple node "DepName" and a complex node "DepDetails." "DepDetails" contains a complex node "Emp" comprising simple node "EmpName." This XML formatted data thereby may represent a portion of a company called a department, named the West department. The details of the West department are that it contains two employees named David and Moris. An exemplary XML transformation policy 544 is applied to the exemplary data object 542 in order to generate exemplary model 562, which may optionally be displayed for a user via a user interface 570.

The generate model sub-process 550 determines that there are two sets of data elements that can be profiled within the exemplary data object 542: Company_Dep_DepName, and Company_Dep_DepDetails_Emp_EmpName, and automatically generates a relational-type representation of the data as instructed according to transformation policy 544. The generate model process 550 may also perform some data analysis by default, or pursuant to transformation policy 544. For example, in the example described in FIG. 5*b* the generate model sub-process 550 analyzes the data to determine a datatype and a precision. It will be appreciated that other data analysis may be performed, and that the data analysis performed on the sample data object may be a distinct sub-process separate from the generate model 550 sub-process.

Referring back to FIG. 2, having obtained a model at step 203, a selection is made 204 to determine which portion of the data represented in the data objects is to be profiled. This selection may be made by a user, or it may be set forth in another data object, file or script ahead of time. If a user is to make the selection, the data model may be presented to the user in a graphical user interface through which the user may select a portion of the data to be profiled.

In the context of an XML formatted data object, the portion may be the data elements contained in one grouping of simple nodes, or it may be all the data in all the groupings of nodes. These selections operate to filter data associated with various rows of the model. Optionally, a selection 204 may also be modified by providing one or more configuration options or rules 240. It will be appreciated that these rules and options may be supplied by a user or by another data object or script. For a non-limiting example, in the XML context described above containing complex nodes "Environment," a selection may comprise the"/Experience/Life_Proposal/Label" data, and a filtering rule may be supplied which dictates that only "/Experience/Life_Proposal/Label" data contained in complex nodes where "Area"="Cambridge" should be profiled; indicating that the resulting profile should only include a profile of "Label" data in the "Area" of Cambridge.

Figure 6A:
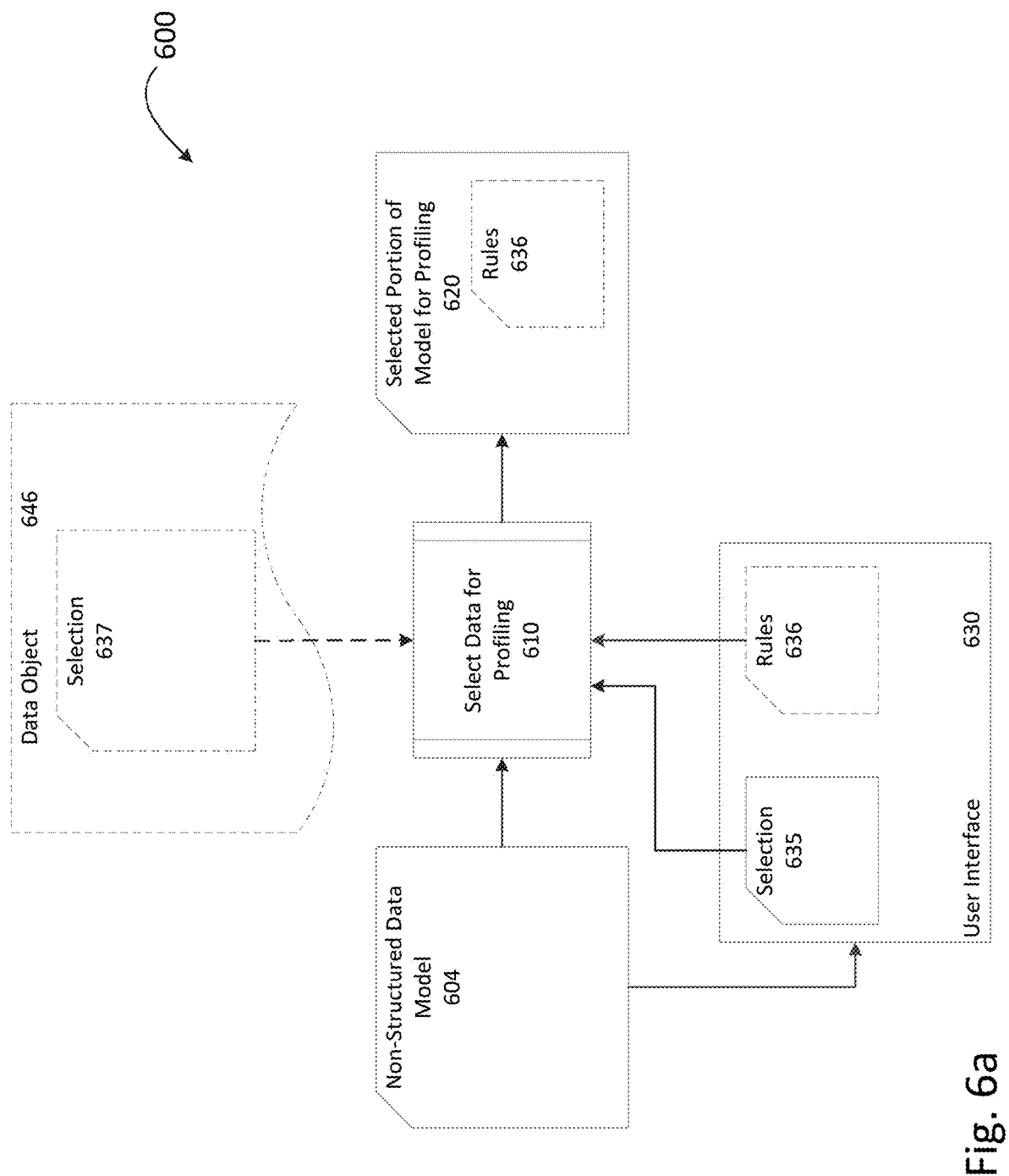
FIG. 6a illustrates a functional flow block diagram for selecting data for profiling according to an exemplary embodiment.
Figure 6B:
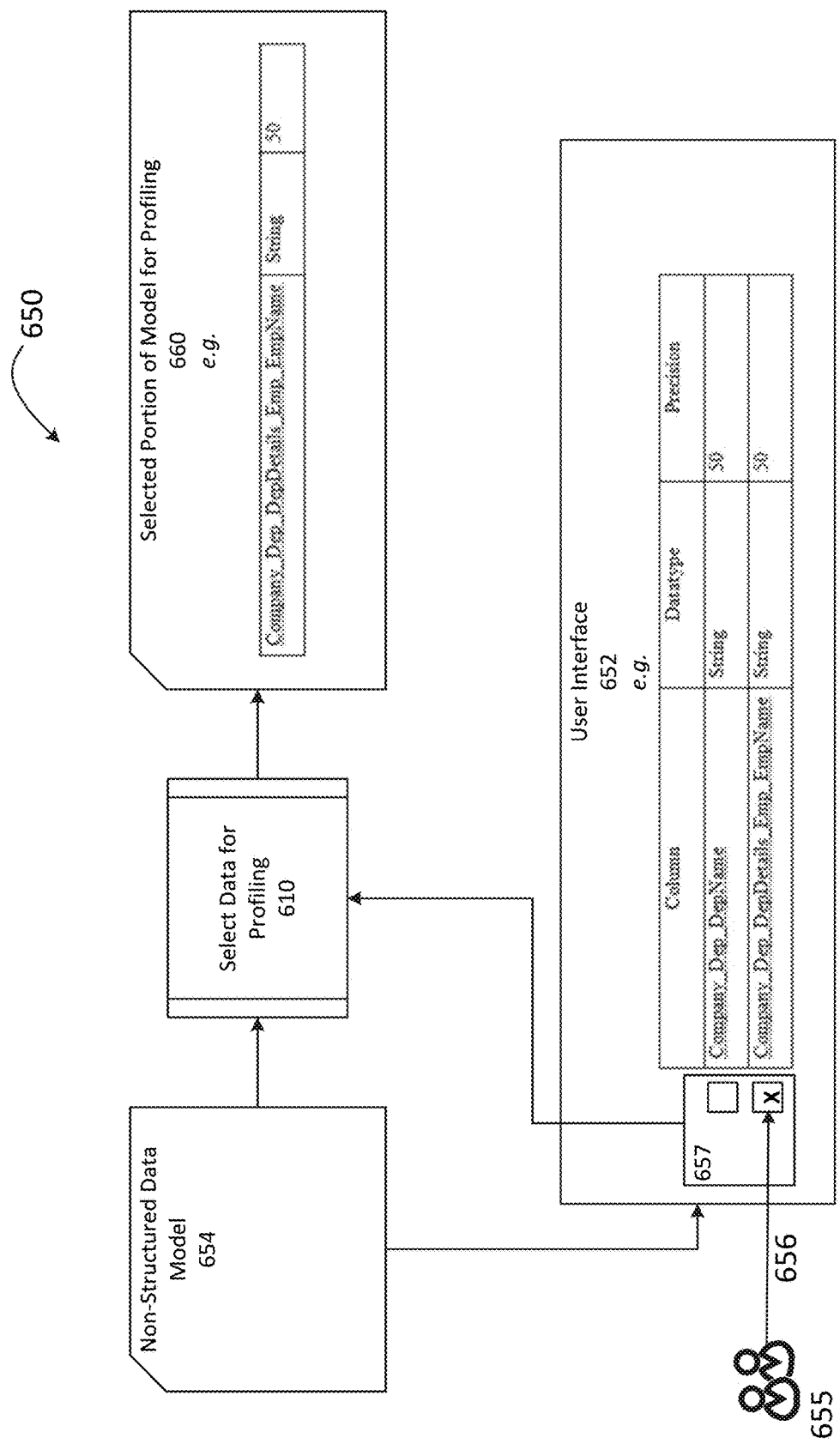
FIG. 6b illustrates a functional flow block diagram for selecting data for profiling according to an exemplary embodiment.

FIGS. 6*a* and 6*b* illustrate the sub-process of selecting data for profiling 610 by way of functional block diagrams 600 and 650 according to an exemplary embodiment. The sub-process of selecting data 610 for profiling takes in the non-structured data model 604 representing the data format in a relational-like listing in order to obtain a selected portion of the model 620. This may be performed for example by data processor 101 executing on one or more computer processors in system 100*a*. This data model 604 may be presented to a user via a user interface 630 so that a user may make a selection 635 of portions of the data model for profiling. The user optionally may specify additional options and/or rules 636 that condition how the system profiles the data. In such a case the selected portion of the model for profiling 620 also contains rules 636. Alternatively, it will be appreciated that the rules 636 may stand alone separate from the selected portion 620. The rules 636 may serve to alter or condition different aspects of the profiling process, for example they may alter or override the data analysis performed on the sample or impose additional conditions on the profile as will be appreciated, or specify special conditions to be accounted for in the profiling process, or operate to filter the data as described above. Optionally, instead of being supplied by a user, a selection 637 may be contained in a data object 646 which is supplied to, or retrieved by, the selection sub-process 610.

For illustrative example, FIG. 6*b* depicts the process of selecting data for profiling 610 data based on a non-structured data model 654. The model 654 is supplied to sub-process 610 and to user interface 652 which displays the model to the user. This exemplary model contains two rows representing data elements that may be profiled "Company_Dep_DepName" and "Company_Dep_DepDetails_Emp_EmpName". Each of these has been evaluated to contain String type data with a precision of 50 characters during the generation of the non-structured data model (for example by sub-process 510). A user 655 selects 656 data for profiling, and this selection 657 informs the data selection sub-process 610, for example, that the user has selected the data elements represented by the grouping of "Company_Dep_DepDetails_Emp_EmpName" to be profiled. This selected portion 660 thus represents, all the data elements contained within each data object, such as for example a multitude of data objects 111, 306, 308, which are to be profiled by for example data profiling system 100a.

FIG. 6c illustrates an exemplary user interface 690 for making a selection of data according to an exemplary embodiment. In this case, a sample data object has been modeled in a relational-like listing of groupings of data elements. This model 691 has therefore been generated by first analyzing a sample data object to determine a format (not illustrated) which results in selecting a data transformation policy (not illustrated) which is applied to the data object to obtain exemplary model 691. Exemplary data model 691 illustrates various fields of a relational-like data model, in this case modelling data formatted in hierarchical data format, which may be XML, or JSON or any other hierarchical data format.

Therefore data model 691 is not a true relational structure. Instead, data model 691 maintains and represents the hierarchy by nesting groupings of nodes, for example node 692. Exemplary node 692 represents all data elements contained in simple nodes "doors" which occurs within the hierarchy within a hierarchical path "/cars/car/" and this hierarchy is represented by collecting nodes within a particular path under a common like hierarchical path 694, which occurs in data object ".\car_inp_car." Also shown in data model 691 are identified Datatype 695 and Precision 696 values for the various fields as determined after some analysis of the data elements present in each grouping. A user is able to make selections within user interface 690, for example, by checking check boxes such as check box 693. It will be appreciated that selections may be made in any suitable manner.

Referring back to FIG. 2, having obtained a selection of the data to be profiled based on a selected portion of the generated model at step 204, next a profile of the non-structured data contained in all of the data files is generated 205.

Figure 7B:
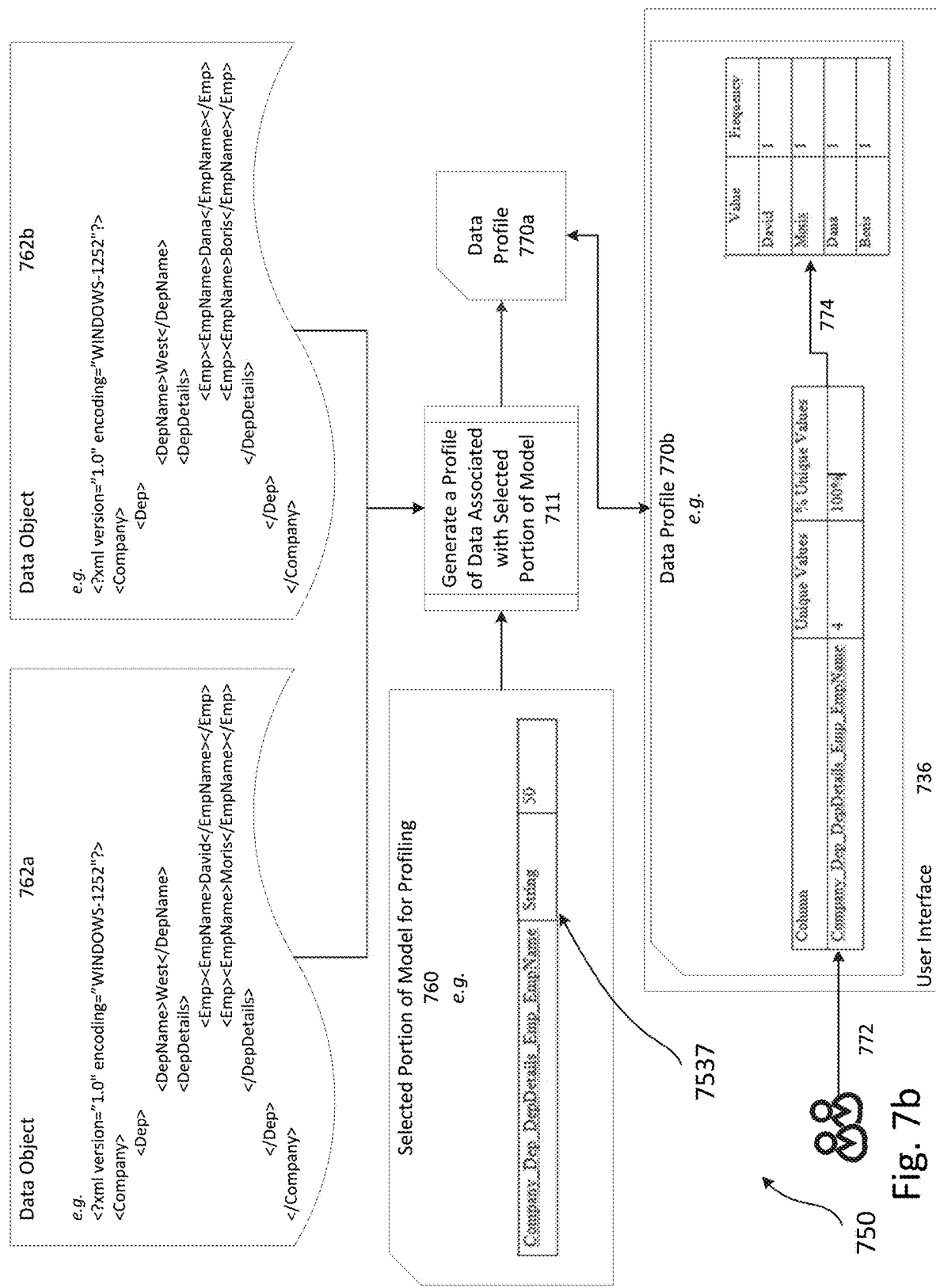
FIG. 7b illustrates generating a profile of data according to an exemplary embodiment.
Figure 7C:
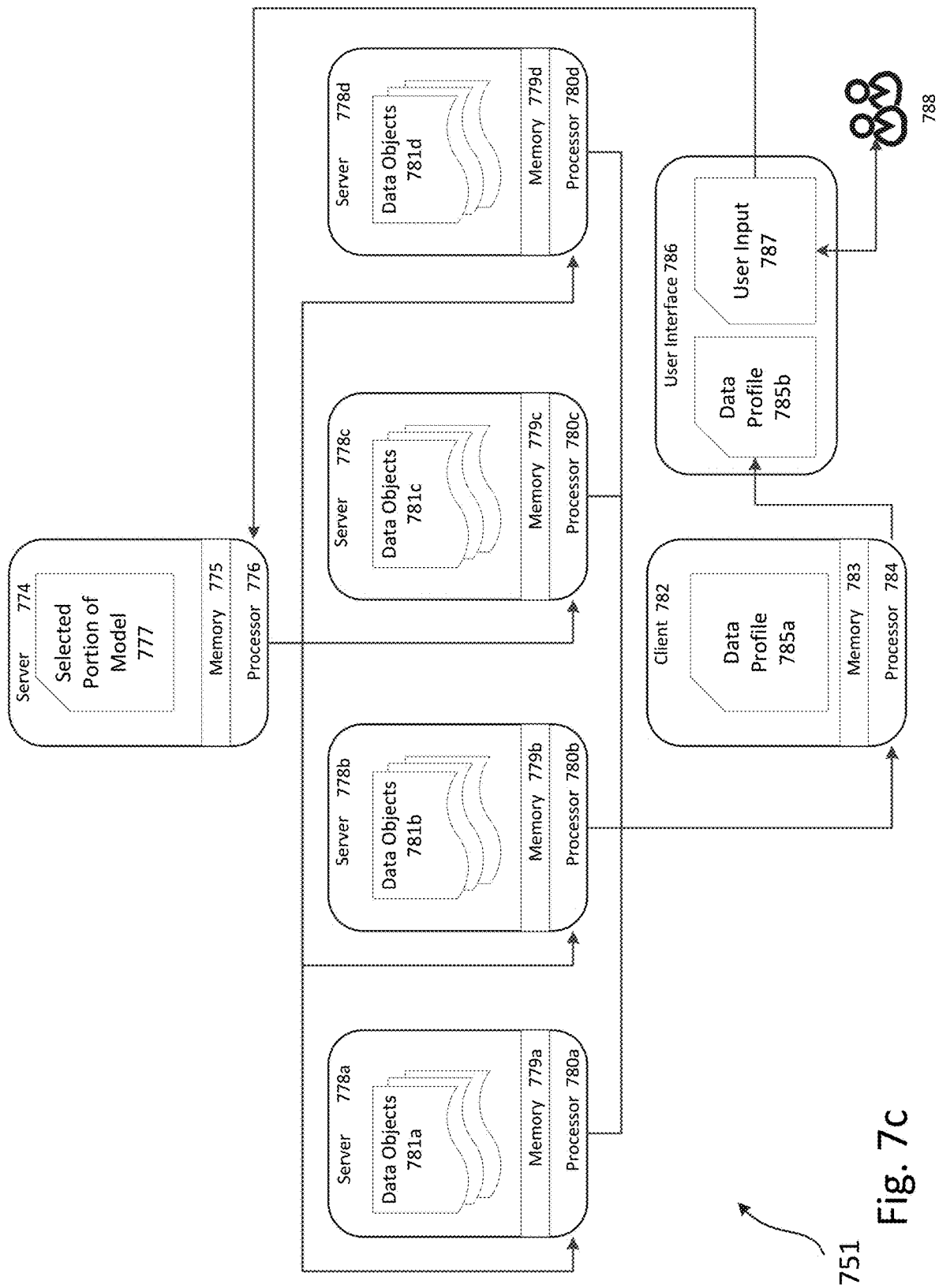
FIG. 7c illustrates generating a profile of data according to an exemplary embodiment.

FIGS. 7a, 7b and 7c illustrate how a data profile may be generated by way of functional block diagrams 700, 750, 751 in accordance with an exemplary embodiment. The sub-process of generating the profile 711 first receives the selected portion of the model 704, and the data objects 710 containing data to be profiled, for example 710a, 710b, 710c, 710d, and generates a data profile 720a, which profile of the data may be transformed into a displayable profile 720b suitable for display on a user interface 730. The selected portion of the model 704 may also contain additional information describing how to transform each data object into a form that can be easily profiled; or as it will be appreciate any additional information may be supplied to sub-process 711 independently, for example in the form of a data transformation policy, or selected portions of the data transformation policy. The profile generation 711 is thereby optimized or tailored based on the selected portion of the model 704, including any data characteristics 737, for example the data type or precision, identified during generation of the model, and or user supplied rules 722.

The process of generating 711 a profile of data 720a evaluates each data element contained within each data object that is described, or associated with, the selected portion of the model. For example, if a selected portion of the data 704 contains grouping Company_Dep_DepDetails_Emp_EmpName, then the data associated with this selected portion will be accounted for in the profile, 720a. The process of profiling 711 the data may perform various analyses, including statistical operations, on the data. For example, the profiling may determine how many distinct values are contained in all the data for each data grouping, or row, in the selected portion of the model 704, or a measurement of how distinct the distinct values contained within the data, or whether there are any NULL values, or a % of the NULL values, or a determination of the data type and precision of the data.

The profile may also include each distinct data value by data grouping or row of the model with a count of how many times a distinct value occurs. It will be appreciated that the data generated for any particular profile may be generated by default, or pursuant to one or more rules 722 that may be supplied for example by a user 735 via a user interface 732. It will be further appreciated that the types of analysis performed may be preconfigured in one or more files or scripts supplied to the profiling engine or sub-process 711.

The process of generating a profile 710 may be an iterative process, whereby portions of the data objects 710, or all of the data objects 710, are profiled to obtain data profile 720a and optionally reviewed by a user in displayable format of data profile 720b displayed on user interface 730. Based on this review, a user may modify or changes the rules by supplying a new set of rules 722, or by supplying a new selection 713 to the selection sub-process 712, before the profile 720a is generated 711 again accounting for the new inputs. In this way, a user may refine the profile in an iterative, on-the-fly, manner.

FIG. 7b provides an illustrative example of profiling two exemplary XML data objects 762a and 762b, each containing data formatted in a hierarchical XML data format. First a selection 760 is provided to the profiling sub-process 711, which includes the grouping Company_Dep_DepDetails_Emp_EmpName, and sub-process 711 receives or obtains data objects 762a and 762b and generates data profile 770a, which can be displayed in displayable format 770b on a user interface 736. Each object 762a and 762b includes two employee names each in a department named West, for a total of four employee names, David, Moris, Dana and Boris. In this example, the user may interact 772 with the displayed profile 770b causing data profile 770b to display additional information 774; for example, when the user highlights a profiled row, or grouping, additional details about the profiled data associated with that row may be displayed 774. If, for example, multiple rows are profiled, the displayable profile 720b may request or obtain further details from data profile 770a when another row is selected.

In another example, FIG. 7c illustrates one benefit of the disclosed invention, namely the ability to process a multitude of data objects in a parallel processing environment 751. Having previously generated a model of the data and selected a portion of it to be profiled 777, this selected portion of the model 777 is accessible by a multitude of processors 780a, 780b, 780c, 780d, which may hold the model 777 in one or more memories, for example memories 779a, 779b, 779c, 779d, accessible by processors, in order to execute the data profiling process in a parallel fashion on processors 780a, 780b, 780c, 780d. To execute the profiling process for example, each processor 780a, 780b, 780c, 780d may execute an instance of data processor 101 executing a profiling sub-process such as sub-process 711. Each processor may access, obtain or retrieve a grouping of data objects, for example groupings of data objects 781a, 781b, 781c, 781d, and execute the profiling sub-process. Groupings of data objects 781a, 781b, 781c, 781d may be obtained as individual files, or as groups of files from one or more locations, which may be remotely accessible across a network, or locally available at one or more of servicers 778a, 778b, 778c, 778d. Each processor 780a, 780b, 780c, 780d may compile its portion of the profile, and then submit its results, to client device 782 where the final data profile 785a is compiled and presented to a user in a displayable format 785*b* via a user interface 786. It will be appreciated that the final data profile may be assembled by any processor or computing device. As explained above, the profiling process may be an iterative process with the user providing additional input 787 in the form of rules or conditions or additional selections, before the profiling process is reinitiated.

Figure 7D:
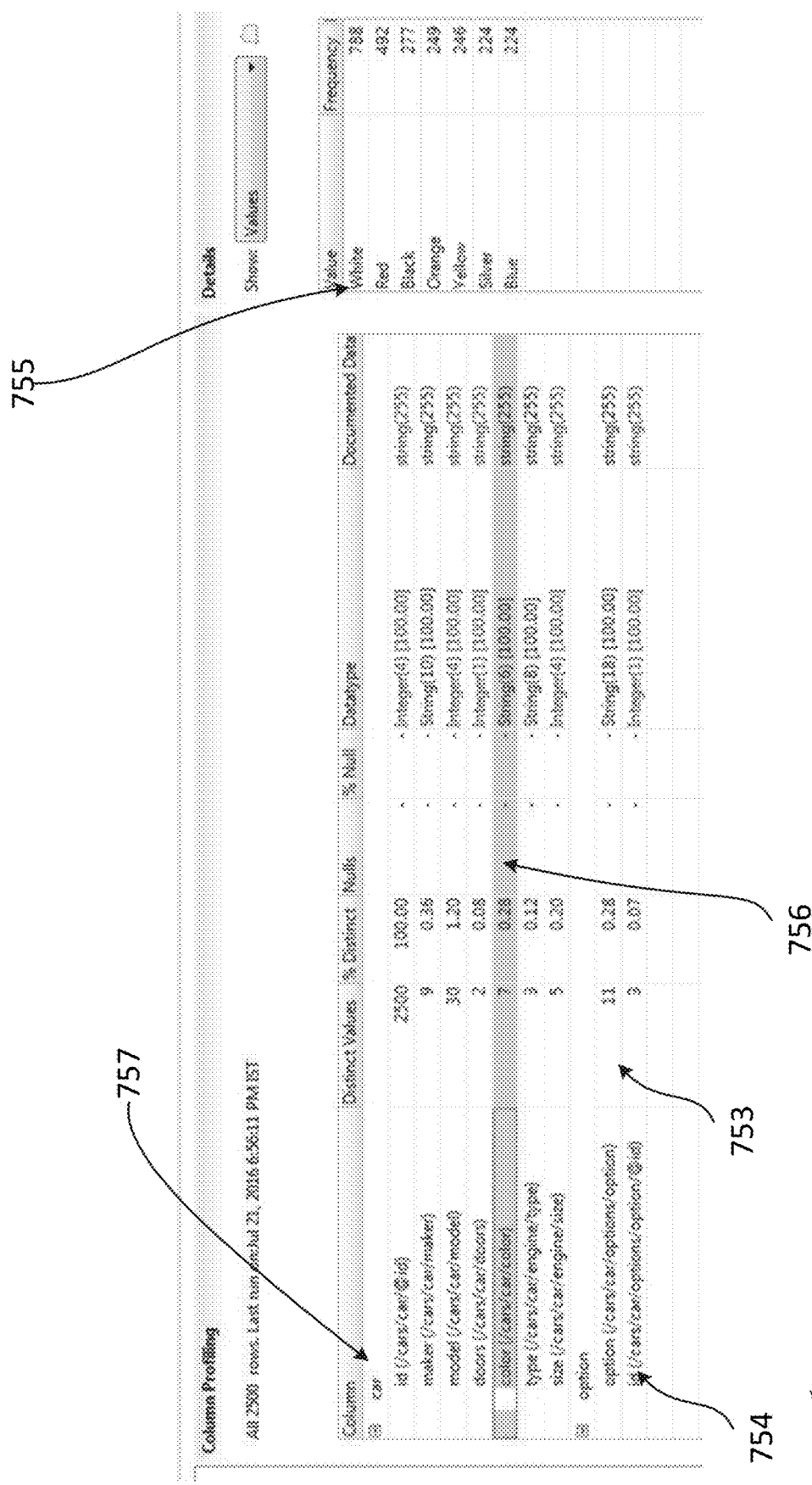
FIG. 7d illustrates a user interface displaying a profile generated according to an exemplary embodiment.

FIG. 7*d* illustrates an exemplary user interface 752 displaying a profile 753 according to an exemplary embodiment. This exemplary profile may be the result of executing the profiling process 711 upon the generated model 691 illustrated in FIG. 6*c* based on the selections 692. In this example the profile 753 again includes the various rows, or groupings of data elements, 754 organized in a way to illustrate the hierarchy by hierarchy rows such as row 757, and as depicted, a selection has been made on the highlighted row 756, which results in additional profiled information regarding that row to be presented to the user.

FIG. 8 illustrates a functional block diagram of a system according to an exemplary embodiment. Referring to FIG. 8, a user application may seek to generate a data profiling using data profiling system 810 to profile one or more data objects. Data profiling system 810 may access the one or more data objects where they are stored. The data may be stored in in one or more locations, for example, in a distributed file system such as a Hadoop Distributed File System HDFS 820, or in a network storage location 830, or in any suitable file system 840. This data may be generated in an ongoing fashion by various external systems or sensors. For example, the data to be profiled may be EDI data generated by an active EDI system 850, or sensor data generated by one or more sensors 860, or the data may be generated by one or more mobile devices 870, or the data can be network traffic data, or other network related data 880, or the data may be generated by one or more websites 890, including social media sites. It will be appreciated that the data that can be profiled may be generated by any system which outputs data in one or more data objects each having a particular format that is subject to characterization, for example by a data transformation policy.

Figure 9:
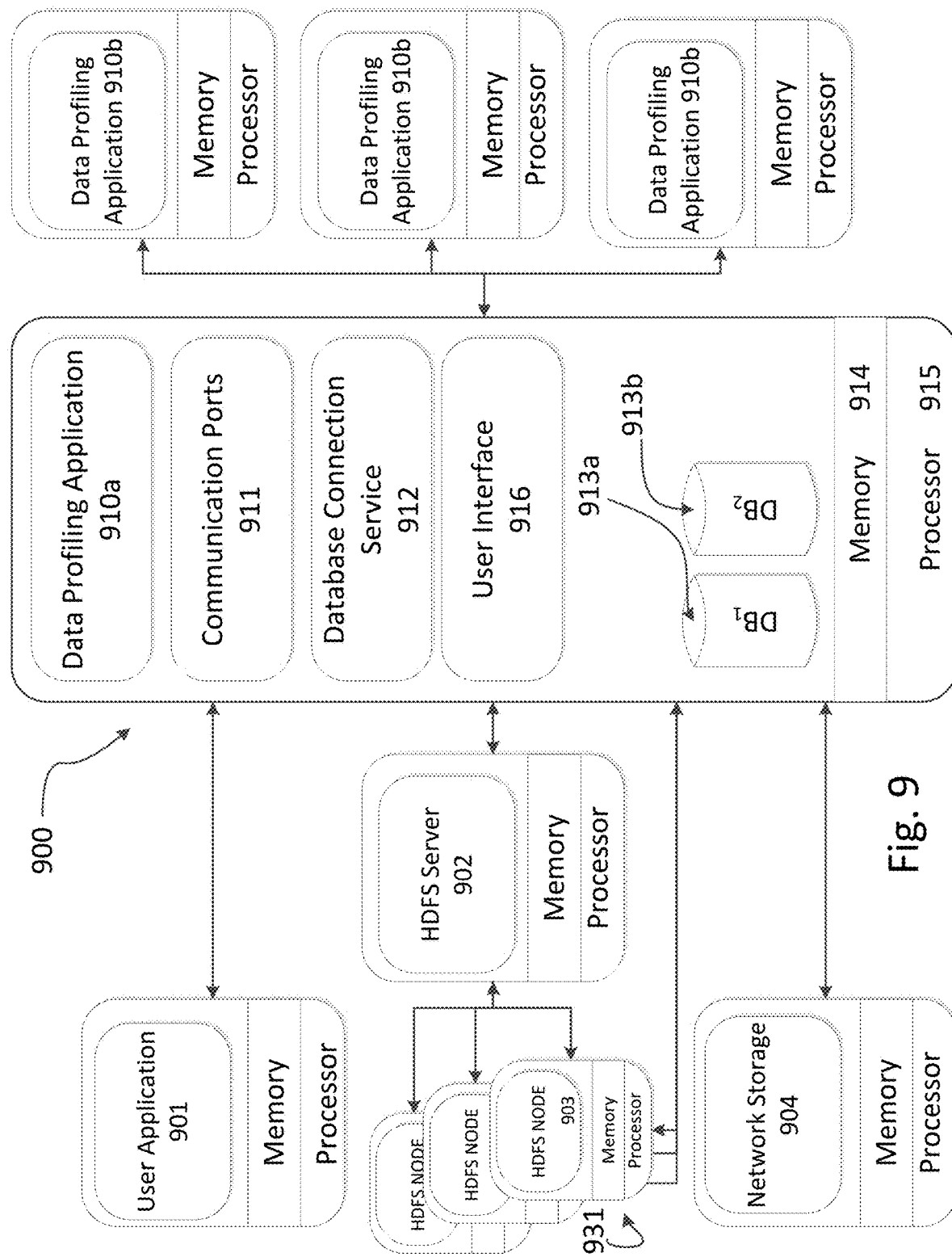
FIG. 9 is a functional block diagram of a system according to an exemplary embodiment.

FIG. 9 illustrates an exemplary computing environment 900 that can be used to carry out the method for generating a data profile of data obtained from a multitude of data objects. This computing environment 900 may include a computer that may have a memory 914, a processor 915, communication ports 911 and the data profiling application 910*a*, which may be stored in an appropriate local storage. This computer may additionally have a user interface 916, and open or more databases 913*a* and 913*b*, with a corresponding database connection service. These databases 913*a* and 913*b* are suitable for storing for example a collection of format characteristics, and a collection of data transformation policies.

The communications ports 911 receive communications sent for example by applications for example, various network storage 904 or a distributed file system including sever 902 and nodes 931 containing data objects to be profiled. Communication ports 911 may also communicate with a remote user application 901, which interacts with the data profiling application 910*a*, or with additional instances of the data profiling application 910*b* which may operate in parallel to generate a data profile. It will also be appreciated that in the case of various processors executing data profiling application 910*b*, these processors may be contained within a single computer, as opposed to in distinct computing devices, in which case communications may occur by the internal bus system, or within a single multi core processor chip or a virtual processing unit (VPU), or a graphical processing unit GPU.

Figure 10:
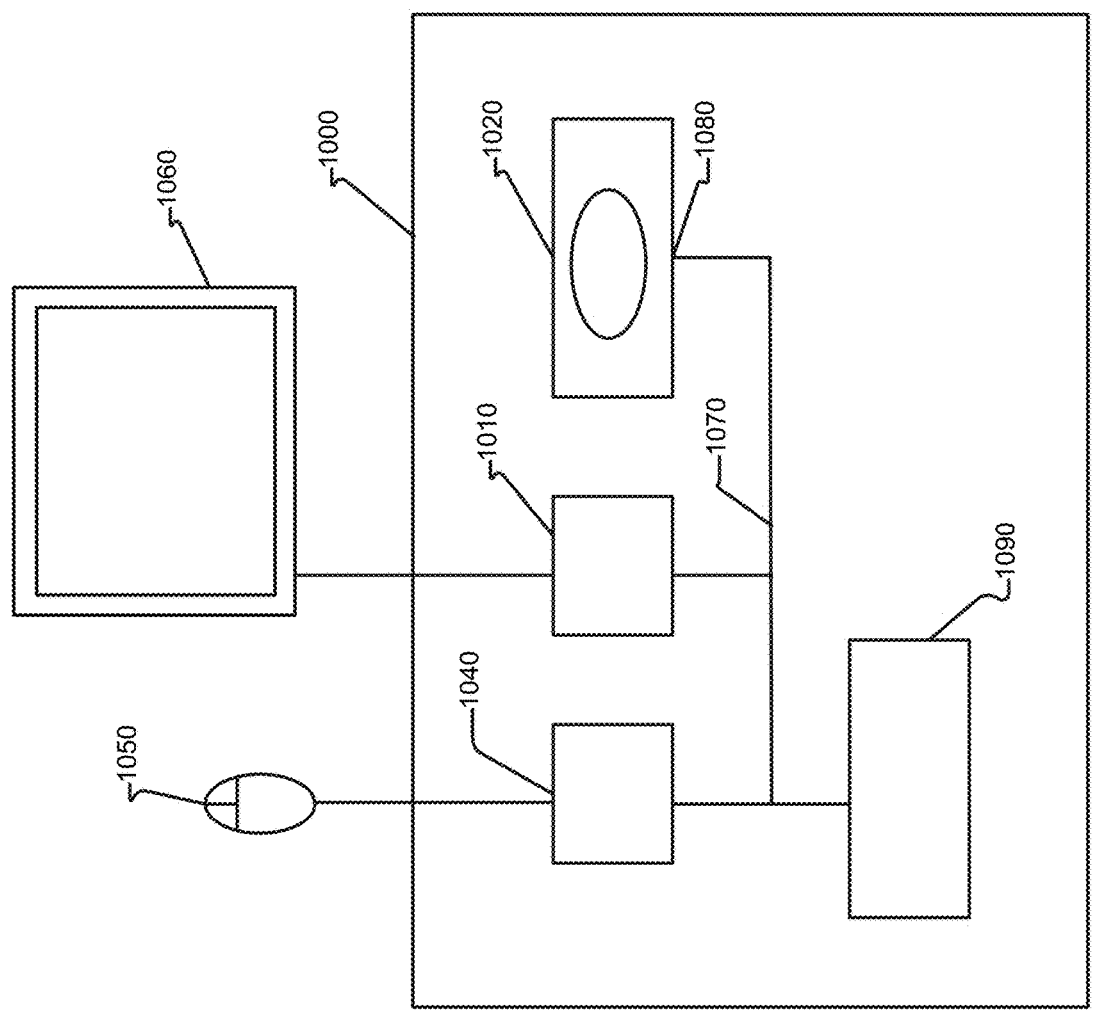
FIG. 10 illustrates an exemplary computing environment that can be used to carry out the method for profiling non-structured data according to an exemplary embodiment.

One or more of the above-described techniques can be implemented in or involve one or more computer systems. FIG. 10 illustrates a generalized example of a computing environment 1000. The computing environment 1000 is not intended to suggest any limitation as to scope of use or functionality of a described embodiment. The computing environment 1000 includes at least one processing unit 1010 and memory 1020. The processing unit 1010 executes computer-executable instructions and can be a real or a virtual processor. In a multi-processing system, multiple processing units execute computer-executable instructions to increase processing power. The memory 1020 can be volatile memory (e.g., registers, cache, RAM), non-volatile memory (e.g., ROM, EEPROM, flash memory, etc.), or some combination of the two. The memory 1020 can store software 1080 implementing described techniques.

A computing environment can have additional features. For example, the computing environment 1000 includes storage 1040, one or more input devices 1050, one or more output devices 1060, and one or more communication connections 1090. An interconnection mechanism 1070, such as a bus, controller, or network interconnects the components of the computing environment 1000. Typically, operating system software or firmware (not shown) provides an operating environment for other software executing in the computing environment 1000, and coordinates activities of the components of the computing environment 1000. The storage 1040 can be removable or non-removable, and includes magnetic disks, magnetic tapes or cassettes, CD-ROMs, CD-RWs, DVDs, or any other medium which can be used to store information and which can be accessed within the computing environment 1000. The storage 1040 can store instructions for the software 1080.

The input device(s) 1050 can be a touch input device such as a keyboard, mouse, pen, trackball, touch screen, or game controller, a voice input device, a scanning device, a digital camera, remote control, or another device that provides input to the computing environment 1000. The output device(s) 1060 can be a display, television, monitor, printer, speaker, or another device that provides output from the computing environment 1000.

The communication connection(s) 1090 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations can be described in the general context of computer-readable media. Computer-readable media are any available media that can be accessed within a computing environment. By way of example, and not limitation, within the computing environment 1000, computer-readable media include memory 1020, storage 1040, communication media, and combinations of any of the above.

Of course, FIG. 10 illustrates computing environment 1000, display device 1060, and input device 1050 as separate devices for ease of identification only. Computing environment 1000, display device 1060, and input device 1050 can be separate devices (e.g., a personal computer connected by wires to a monitor and mouse), can be integrated in a single device (e.g., a mobile device with a touch-display, such as a smartphone or a tablet), or any combination of devices (e.g., a computing device operatively coupled to a touch-screen display device, a plurality of computing devices attached to a single display device and input device, etc.). Computing environment 1000 can be a set-top box, personal computer, or one or more servers, for example a farm of networked servers, a clustered server environment, or a cloud network of computing devices.

Figure 11A:
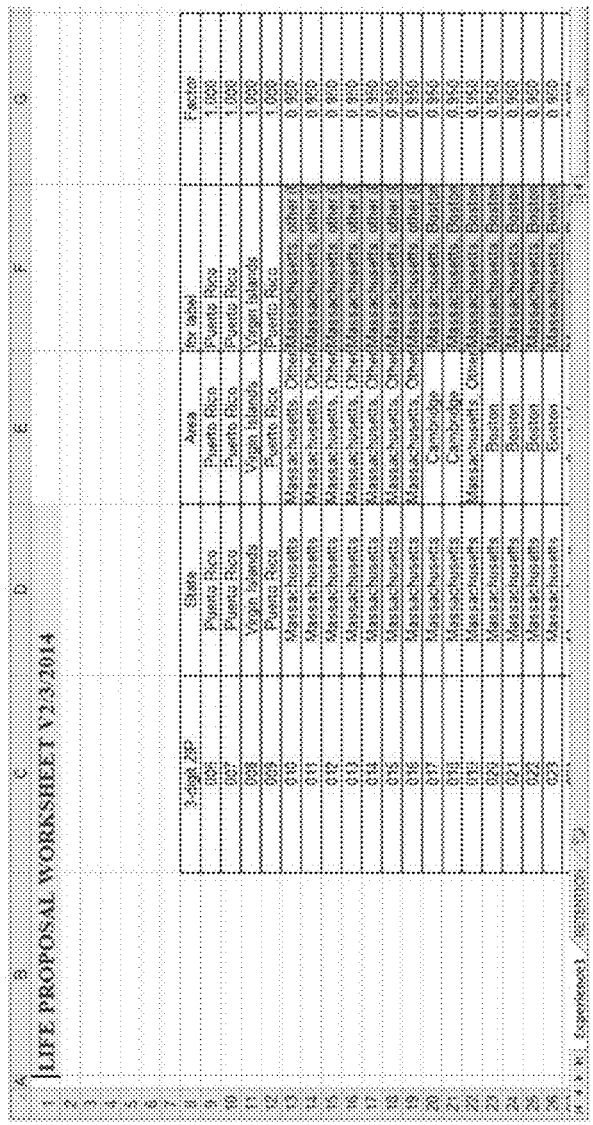
Figure 11B:
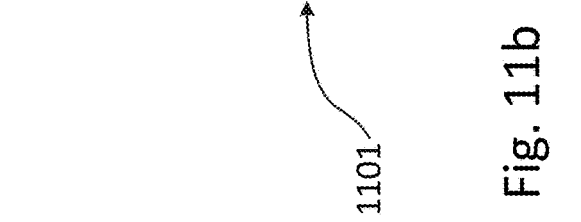

FIGS. 11*a*, 11*b*, 11*c*, 11*d*, and 11*e* illustrate various user interface displays and intermediate steps during the process of profiling an unstructured data object, namely a spreadsheet, according to an exemplary embodiment. FIG. 11*a* illustrates an exemplary unstructured data object 1100. Data object 1100 is a worksheet titled "Life Proposal Worksheet V2/3/2014" which contains five columns of data located in an arbitrary portion of spreadsheet. FIG. 11*b* illustrates an exemplary script 1101 that may serve as a portion of a data transformation policy. Data object 1100 may be provide to system 100*a*, and processed according to the techniques described above. If data object 1100 is of an unknown format, that is one that the system 100*a* has not encountered before, a user may identify that the file contains data formatted in a new or customized format, and may additional supply a new or customized data transformation policy including script 1101.

Script 1101 is an exemplary script written in DT TGP, which is a declarative scripting language for Informatica's DT Engine and is used for parsing unstructured data. The exemplary script 1101 translates the worksheet in FIG. 11*a* into an intermediate generic XML representation. The statements included in script 1101 identify a source data object, searches the worksheet for the beginning of a data table included within the worksheet (here based on the title of the first column) and begins an iterative process over all the elements within the table. The script then extracts the fields based on the cell order and adds them to the generated XML.

Figure 11E:
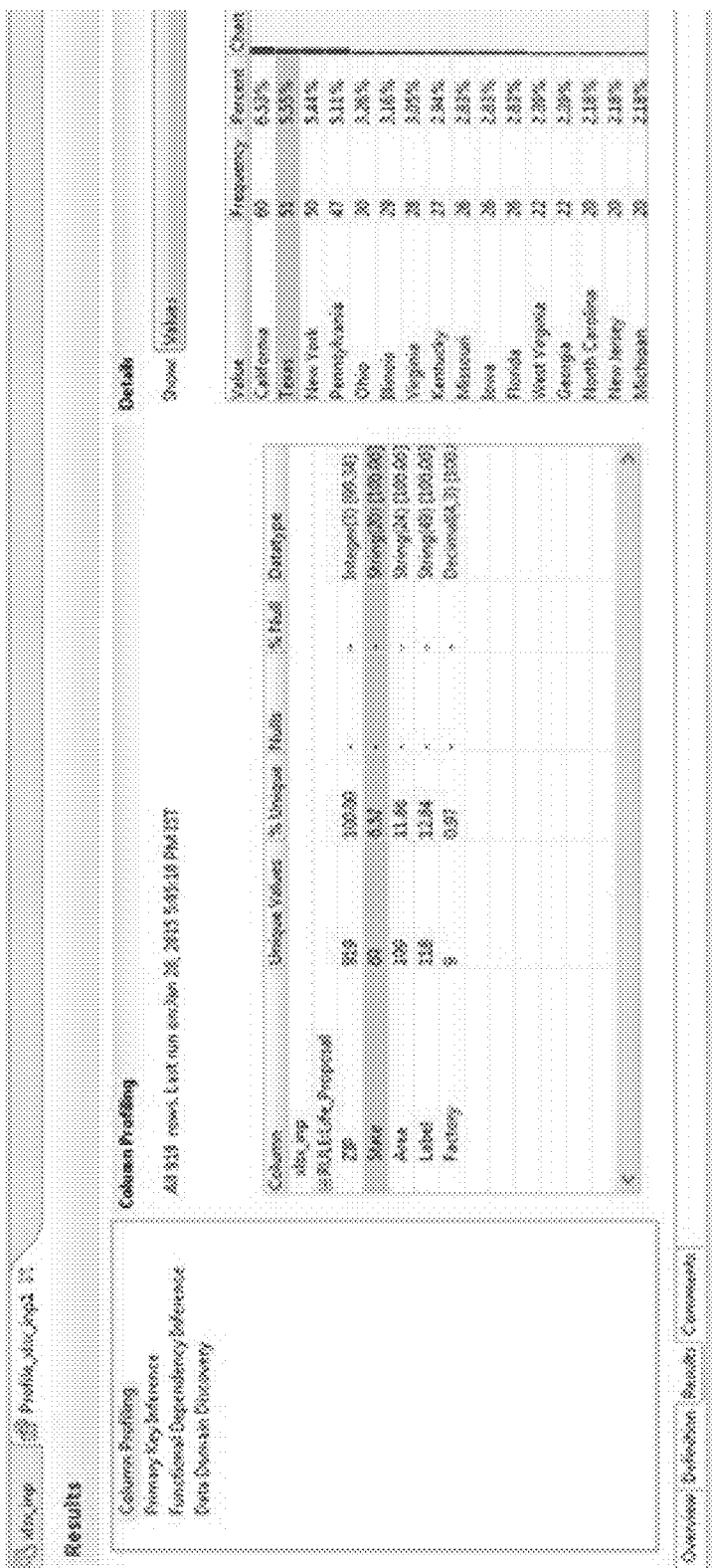

Applying script 1101 to data object 1100 transforms the data format from an unstructured format into a hierarchical format as depicted in FIG. 11*c*. Here the data in data object 1100 has been transformed into a hierarchical XML formatted data object 1102, and then for example to generate a model of the data object, an additional data transformation policy describing XML transformations may be applied to data object 1102 to obtain the model illustrated in FIG. 11*d*. FIG. 11*d* illustrates a user interface for selecting portions of the data for profiling along with a number of other optional configurations and rules. FIG. 11*e* illustrates a user interface displaying the data profile, along with additional configuration options and details regarding the selected data "State."

Figure 11F:
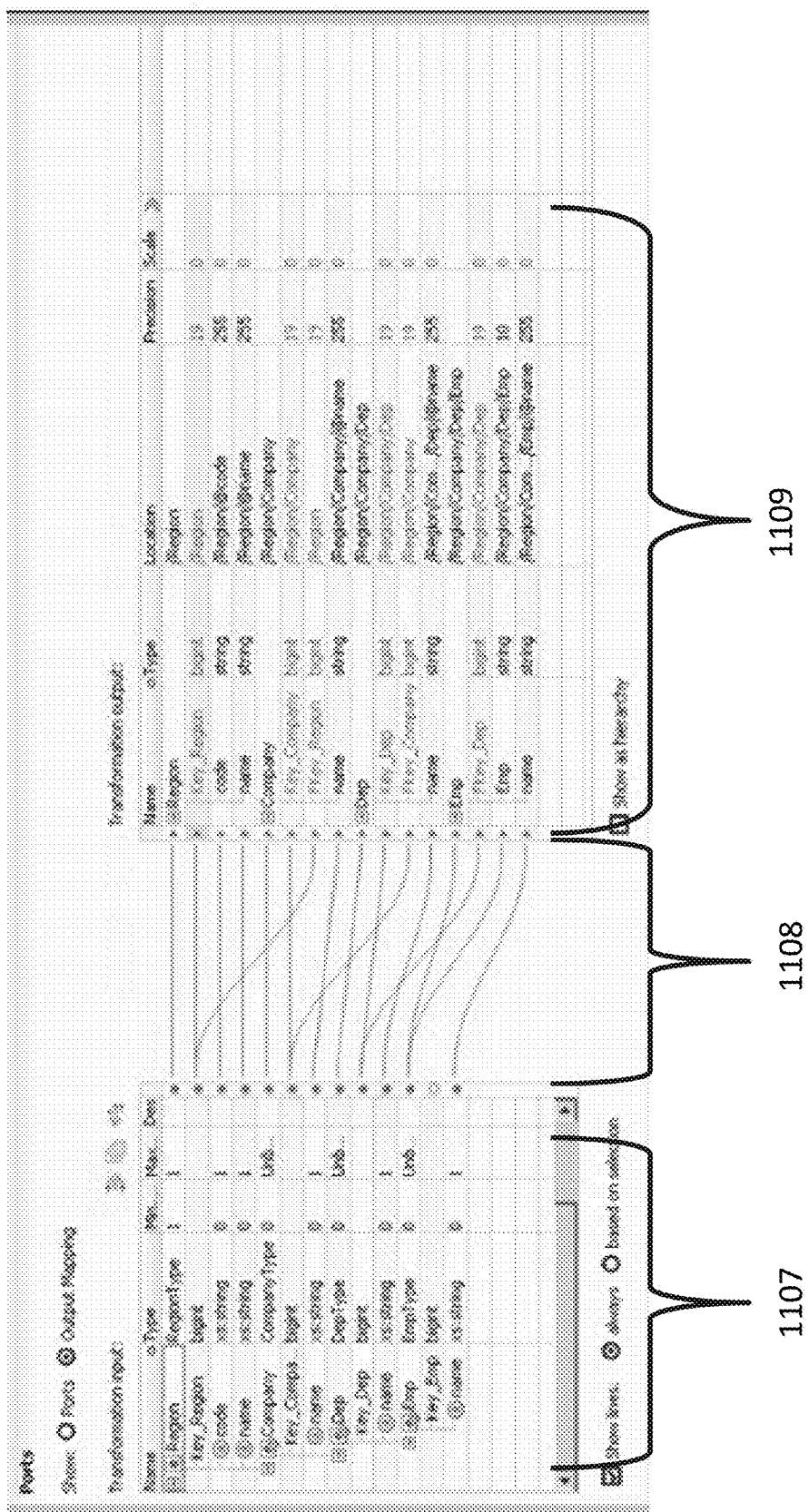

FIG. 11*f* illustrates an optional user interface that logically describes, and allows a user to modify, the mapping 1108 of an input data object 1107 to a relational-type data model 1109. The input data object contains elements arranged in a hierarchical data format, for example similar to data objects 762*a* and 762*b*. User display portion 1108 illustrates the relationships between the hierarchical data elements illustrated in portion 1107 and the desired relational-type data model rows in relational-type data model 1109.

The various embodiments disclosed consist of computer software code recorded on computer readable media and executed by one or more processors. Where the embodiments are disclosed in terms of their function in this description it is for the purpose of clarity of description, but need not be discrete devices or code portions, and may be integrated segregated or integrated in any particular manner. Various computer devices may be used to implement the embodiments such as servicers, PCs, mobile devices, laptop computers, tablets, handheld computing devices or various combinations of these devices. Furthermore, the embodiments need not be implemented in software code, but instead may be hardcoded into, for example, FPGAs, ASIC chips, customized processors, Stretch microprocessors, DSP chips, ARM processors, microprocessors, system on a chip based devices and the like.

Having described and illustrated the principles of our invention with reference to the described embodiment, it will be recognized that the described embodiment can be modified in arrangement and detail without departing from such principles. It should be understood that the programs, processes, or methods described herein are not related or limited to any particular type of computing environment, unless indicated otherwise. Various types of general purpose or specialized computing environments can be used with or perform operations in accordance with the teachings described herein. Elements of the described embodiment shown in software can be implemented in hardware, as discussed above, and vice versa.

In view of the many possible embodiments to which the principles of our invention can be applied, we claim as our invention all such embodiments as can come within the scope and spirit of the following claims and equivalents thereto.

The invention claimed is:

1. A method executed by one or more computing devices for generating a profile of unstructured data comprising:
 receiving, by at least one of the one or more computing devices, a selection of an unstructured data object for profiling;
 converting, by at least one of the one or more computing devices, data in the unstructured data object into a semi-structured data object having a hierarchical structure;
 selecting, by at least one of the one or more computing devices, a data transformation policy based on a format of the semi-structured data object;
 generating, by at least one of the one or more computing devices, a relational model modeling relationships between entities in the semi-structured data object by applying the data transformation policy to the semi-structured data object;
 selecting, by at least one of the one or more computing devices, a portion of the relational model indicative of a portion of unstructured data in the unstructured data object; and
 generating, by at least one of the one or more computing devices, a profile of the portion of unstructured data in the unstructured data object based at least in part on the selected portion of the relational model.

2. The method of claim 1, wherein the data transformation policy is selected from a plurality of predefined policies.

3. The method of claim 1, wherein selecting the data transformation policy comprises at least one of:
 generating a customized data transformation policy for the semi-structured data object; or
 receiving a customized data transformation policy for the semi-structured data object.

4. The method of claim 3, wherein the customized data transformation policy uses a customized script to generate the relational model and to map the semi-structured data object to the relational model.

5. The method of claim 3, wherein the customized data transformation policy comprises supplementary metadata from which the relational model is generated.

6. The method of claim 3, wherein the customized data transformation policy is received from a user via a user interface.

7. The method of claim 1, wherein the profile of the portion of unstructured data is generated by performing one or more statistical operations on the selected portion of the relational model.

8. The method of claim 1, wherein the selection of the portion of the model is received from a user via the user interface.

9. The method of claim 1, wherein the format of the unstructured data object is determined by analyzing the unstructured data object using a set of characteristics of known data object formats.

10. The method of claim 1, wherein the format of the unstructured data object is determined by receiving the format from a user.

11. The method of claim 1, wherein the unstructured data object is stored in a distributed file system.

12. The method of claim 1, wherein generating a profile of the portion of unstructured data comprises:
   placing the relational model in one or more memories accessible by a plurality of processors in the one or more computing devices; and
   instructing the processors to operate in parallel to generate the profile.

13. The method of claim 1, wherein the profile of the portion of unstructured data is generated without storing data from the unstructured data object in a non-transitory data store.

14. The method of claim 1, wherein the relational model is structured as a relational database schema.

15. The method of claim 1, wherein the semi-structured data object comprises one or more parquet objects.

16. The method of claim 1, wherein the semi-structured data object comprises data represented in one or more of: java simple object notation (JSON), Extensible Markup Language (XML), Abstract Syntax Notation One (ASN.1), common business-oriented language (COBOL), or Avro.

17. The method of claim 1, wherein the semi-structured data object comprises one or more of: electronic data interchange (EDI) data, Financial products Markup Language (FpML) data, Deposit Trust & Clearing Corporation's (DTCC) National Securities Clearing Corporation (NSCC) data, Health Level 7 International (HL7) data, or Society for Worldwide Interbank Financial Telecommunication (SWIFT) data.

18. A system for generating a profile of unstructured data comprising:
   one or more processors; and
   one or more memories operatively coupled to at least one of the one or more processors and having instructions stored thereon that, when executed by at least one of the one or more processors, cause the at least one of the one or more processors to:
      receive a selection of an unstructured data object for profiling;
      convert data in the unstructured data object into a semi-structured data object having a hierarchical structure;
      select a data transformation policy based on a format of the semi-structured data object;
      generate a relational model modeling relationships between entities in the semi-structured data object by applying the data transformation policy to the semi-structured data object;
      select a portion of the relational model indicative of a portion of unstructured data in the unstructured data object; and
      generate a profile of the portion of unstructured data in the unstructured data object based at least in part on the selected portion of the relational model.

19. The system of claim 18, wherein the data transformation policy is selected from a plurality of predefined policies.

20. The system of claim 18, wherein the instructions that, when executed by at least one of the one or more processors, cause at least one of the one or more processors to select the data transformation policy further cause at least one of the one or more processors to:
   generate a customized data transformation policy for the semi-structured data object; or
   receive a customized data transformation policy for the semi-structured data object.

21. The system of claim 20, wherein the customized data transformation policy uses a customized script to generate the relational model and to map the semi-structured data object to the relational model.

22. The system of claim 20, wherein the customized data transformation policy comprises supplementary metadata from which the relational model is generated.

23. The system of claim 20, wherein the method further comprises displaying on a display device, by at least one of the one or more computing devices, a user interface capable of receiving the customized data transformation policy.

24. The system of claim 18, wherein the profile of the portion of unstructured data is generated by performing one or more statistical operations on the selected portion of the relational model.

25. The system of claim 18, wherein the selection of the portion of the model is received from a user via the user interface.

26. The system of claim 18, wherein the format of the unstructured data object is determined by analyzing the unstructured data object using a set of characteristics of known data object formats.

27. The system of claim 18, wherein the format of the unstructured data object is determined by receiving the format from a user.

28. The system of claim 18, wherein the unstructured data object is stored in a distributed file system.

29. The system of claim 18, wherein the instructions that, when executed by at least one of the one or more processors, cause at least one of the one or more processors to generate a profile of the portion of the unstructured data further cause at least one of the one or more processors to:
   place the relational model in one or more memories accessible by a plurality of processors in the one or more computing devices; and
   instruct the processors to operate in parallel to generate the profile.

30. The system of claim 18, wherein the profile of the portion of unstructured data is generated without storing data from the unstructured data object in a non-transitory data store.

31. The system of claim 18, wherein the relational model is structured as a relational database schema.

32. The system of claim 18, wherein the semi-structured data object comprises one or more parquet objects.

33. The system of claim 18, wherein the semi-structured data object comprises data represented in one or more of: java simple object notation (JSON), Extensible Markup Language (XML), Abstract Syntax Notation One (ASN.1), common business-oriented language (COBOL), or Avro.

34. The system of claim 18, wherein the semi-structured data object comprises one or more of: electronic data interchange (EDI) data, Financial products Markup Language (FpML) data, Deposit Trust & Clearing Corporation's (DTCC) National Securities Clearing Corporation (NSCC) data, Health Level 7 International (HL7) data, or Society for Worldwide Interbank Financial Telecommunication (SWIFT) data.

35. At least one non-transitory computer readable medium storing a set of instructions for generating a profile of unstructured data, the set of instructions comprising instructions which, when executed by one or more processors cause the one or more processors to:
receive a selection of an unstructured data object for profiling;
convert data in the unstructured data object into a semi-structured data object having a hierarchical structure;
select a data transformation policy based on a format of the semi-structured data object;
generate a relational model modeling relationships between entities in the semi-structured data object by applying the data transformation policy to the semi-structured data object;
select a portion of the relational model indicative of a portion of unstructured data in the unstructured data object; and
generate a profile of the portion of unstructured data in the unstructured data object based at least in part on the selected portion of the relational model.

36. The at least one non-transitory computer readable medium of claim 35, wherein the data transformation policy is selected from a plurality of predefined policies.

37. The at least one non-transitory computer readable medium of claim 35, wherein the instructions that, when executed by at least one of the one or more computing devices, cause at least one of the one or more computing devices to select the data transformation policy further cause at least one of the one or more computing devices to:
generate a customized data transformation policy for the semi-structured data object; or
receive a customized data transformation policy for the semi-structured data object.

38. The at least one non-transitory computer readable medium of claim 37, wherein the customized data transformation policy uses a customized script to generate the relational model and to map the semi-structured data object to the relational model.

39. The at least one non-transitory computer readable medium of claim 37, wherein the customized data transformation policy comprises supplementary metadata from which the relational model is generated.

40. The at least one non-transitory computer readable medium of claim 37, wherein the method further comprises displaying on a display device, by at least one of the one or more computing devices, a user interface capable of receiving the customized data transformation policy.

41. The at least one non-transitory computer readable medium of claim 35, wherein the profile of the portion of unstructured data is generated by performing one or more statistical operations on the selected portion of the relational model.

42. The at least one non-transitory computer readable medium of claim 35, wherein the selection of the portion of the model is received from a user via the user interface.

43. The at least one non-transitory computer readable medium of claim 35, wherein the format of the unstructured data object is determined by analyzing the unstructured data object using a set of characteristics of known data object formats.

44. The at least one non-transitory computer readable medium of claim 35, wherein the format of the unstructured data object is determined by receiving the format from a user.

45. The at least one non-transitory computer readable medium of claim 35, wherein the unstructured data object is stored in a distributed file system.

46. The at least one non-transitory computer readable medium of claim 35, wherein the instructions that, when executed by at least one of the one or more computing devices, cause at least one of the one or more computing devices to generate a profile of the portion of the unstructured data further cause at least one of the one or more computing devices to:
place the relational model in one or more memories accessible by a plurality of processors in the one or more computing devices; and
instruct the processors to operate in parallel to generate the profile.

47. The at least one non-transitory computer readable medium of claim 35, wherein the profile of the portion of unstructured data is generated without storing data from the unstructured data object in a non-transitory data store.

48. The at least one non-transitory computer readable medium of claim 35, wherein the relational model is structured as a relational database schema.

49. The at least one non-transitory computer readable medium of claim 35, wherein the semi-structured data object comprises one or more parquet objects.

50. The at least one non-transitory computer readable medium of claim 35, wherein the semi-structured data object comprises data represented in one or more of: java simple object notation (JSON), Extensible Markup Language (XML), Abstract Syntax Notation One (ASN.1), common business-oriented language (COBOL), or Avro.

51. The at least one non-transitory computer readable medium of claim 35, wherein the semi-structured data object comprises one or more of: electronic data interchange (EDI) data, Financial products Markup Language (FpML) data, Deposit Trust & Clearing Corporation's (DTCC) National Securities Clearing Corporation (NSCC) data, Health Level 7 International (HL7) data, or Society for Worldwide Interbank Financial Telecommunication (SWIFT) data.

* * * * *